US011621755B2

(12) United States Patent
Wu et al.

(10) Patent No.: US 11,621,755 B2
(45) Date of Patent: Apr. 4, 2023

(54) BEAMFORMING ANTENNAS THAT SHARE RADIO PORTS ACROSS MULTIPLE COLUMNS

(71) Applicant: CommScope Technologies LLC, Hickory, NC (US)

(72) Inventors: Ligang Wu, Suzhou (CN); Björn Lindmark, Sollentuna (SE); XiaoHua Hou, Richardson, TX (US); Martin L. Zimmerman, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 114 days.

(21) Appl. No.: 17/149,187

(22) Filed: Jan. 14, 2021

(65) Prior Publication Data

US 2022/0069874 A1 Mar. 3, 2022

Related U.S. Application Data

(63) Continuation-in-part of application No. PCT/CN2020/111926, filed on Aug. 27, 2020.

(51) Int. Cl.
*H04B 7/06* (2006.01)
*H04B 7/0413* (2017.01)

(52) U.S. Cl.
CPC ......... *H04B 7/0617* (2013.01); *H04B 7/0413* (2013.01)

(58) Field of Classification Search
CPC .. H04B 7/0617; H04B 7/0413; H04B 7/0691; H04B 7/10
USPC .......................................................... 375/267
See application file for complete search history.

(56) References Cited

U.S. PATENT DOCUMENTS

| 8,599,955 | B1 | 12/2013 | Kludt et al. | |
|---|---|---|---|---|
| 8,619,927 | B2 | 12/2013 | Kludt et al. | |
| 8,654,883 | B2 | 2/2014 | Harel et al. | |
| 8,837,650 | B2 | 9/2014 | Kludt et al. | |
| 8,842,765 | B2 | 9/2014 | Kludt et al. | |
| 8,861,635 | B2 | 10/2014 | Wang et al. | |
| 9,344,168 | B2 | 5/2016 | Abreu et al. | |
| 2007/0205955 | A1* | 9/2007 | Korisch | H01Q 21/08 343/797 |
| 2012/0212372 | A1* | 8/2012 | Petersson | H01Q 21/08 343/893 |

(Continued)

FOREIGN PATENT DOCUMENTS

| CN | 1553725 A | 12/2004 |
|---|---|---|
| CN | 102916735 A | 2/2013 |

(Continued)

OTHER PUBLICATIONS

Notification of Transmittal of the International Search Report and the Written Opinion of the International Searching Authority, or the Declaration, in corresponding PCT Application No. PCT/CN2020/111926 (dated May 26, 2021).

*Primary Examiner* — Fitwi Y Hailegiorgis
(74) *Attorney, Agent, or Firm* — Myers Bigel, P.A.

(57) ABSTRACT

Antenna systems are provided. An antenna system includes a beamforming array having a plurality of vertical columns of radiating elements that are each configured to transmit at least three antenna beams per polarization. Moreover, the antenna system includes a beamforming radio having a plurality of radio frequency ports per polarization that are coupled to and fewer than the vertical columns.

20 Claims, 21 Drawing Sheets

(56) References Cited

U.S. PATENT DOCUMENTS

| | | |
|---|---|---|
| 2013/0044650 A1 | 2/2013 | Barker et al. |
| 2014/0347248 A1 | 11/2014 | Stjernman |
| 2016/0065290 A1 | 3/2016 | Zhu et al. |

FOREIGN PATENT DOCUMENTS

| | | |
|---|---|---|
| WO | 2011120090 A1 | 10/2011 |
| WO | 2020243885 A1 | 12/2020 |

\* cited by examiner

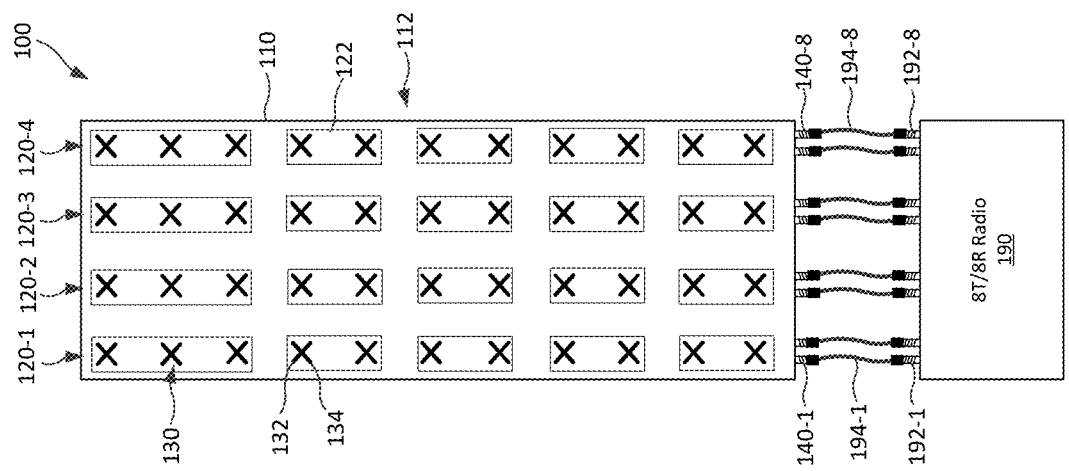

| Column<br>Attribute | 1 | 2 | 3 | 4 | 5 | 6 |
|---|---|---|---|---|---|---|
| Amplitude (dB) | -4.76 | -1.76 | 0 | 0 | -1.76 | -4.76 |
| Phase | D +/- 180 | A | B | C | D | A +/- 180 |
| Beam 1 | -540 | -405 | -270 | -135 | 0 | 135 |
| Beam 2 | -180 | -135 | -90 | -45 | 0 | 45 |
| Beam 3 | 180 | 135 | 90 | 45 | 0 | -45 |
| Beam 4 | 540 | 405 | 270 | 135 | 0 | -135 |
| Broadcast | -180 | 0 | -90 | -90 | 0 | -180 |

| Column<br>Attribute | 1 | 2 | 3 | 4 | 5 | 6 | 7 | 8 |
|---|---|---|---|---|---|---|---|---|
| Amplitude (dB) | -1 | -1 | -1 | -1 | -7 | -7 | -7 | -7 |
| Phase | A | B | C | D | A +/- 180 | B +/- 180 | C +/- 180 | D +/- 180 |
| Beam 1 | 0 | 130 | 260 | 405 | 540 | B +/- 180 | C +/- 180 | D +/- 180 |
| Beam 2 | 0 | 60 | 100 | 140 | 180 | B +/- 180 | C +/- 180 | D +/- 180 |
| Beam 3 | 0 | -60 | -100 | -140 | -180 | B +/- 180 | C +/- 180 | D +/- 180 |
| Beam 4 | 0 | -130 | -260 | -405 | -540 | B +/- 180 | C +/- 180 | D +/- 180 |

FIG. 3C

| Column\Attribute | 1 | 2 | 3 | 4 | 5 | 6 | 7 | 8 |
|---|---|---|---|---|---|---|---|---|
| Amplitude (dB) | -10.4 | -10.4 → -4.76 | -0.4 → -1.76 | -0.4 | -0.4 | -0.4 → -1.76 | -10.4 → -4.76 | -10.4 |
| Phase | C +/- 180 | D +/- 180 | A | B | C | D | A +/- 180 | B +/- 180 |
| Beam 1 | -270 | -135 | 0 | 135 | 270 | 405 | 540 | 675 |
| Beam 2 | -90 | -45 | 0 | 45 | 90 | 135 | 180 | 225 |
| Beam 3 | 90 | 45 | 0 | -45 | -90 | -135 | -180 | -225 |
| Beam 4 | 270 | 135 | 0 | -135 | -270 | -405 | -540 | -675 |

*FIG. 3E*

| Column<br>Attribute | 1 | 2 | 3 | 4 | 5 | 6 | 7 | 8 |
|---|---|---|---|---|---|---|---|---|
| Amplitude (dB) | -3 | -3 | -3 | 0 | 0 | -3 | -3 | -3 |
| Phase | A | B | C | D | E | A | B | C |
| Beam 1 | 0 | 144 | 288 | 432 | 576 | 0 | 144 | 288 |
| Beam 2 | 0 | 72 | 144 | 216 | 288 | 0 | 72 | 144 |
| Beam 3 | 0 | 0 | 0 | 0 | 0 | 0 | 0 | 0 |
| Beam 4 | 0 | -72 | -144 | -216 | -288 | 0 | -72 | -144 |
| Beam 5 | 0 | -144 | -288 | -432 | -576 | 0 | -144 | -288 |

FIG. 4C

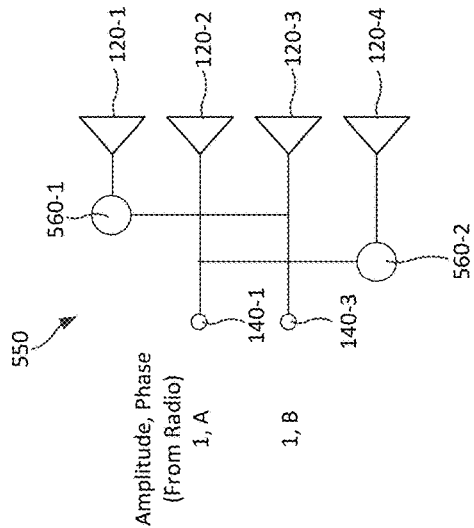
*FIG. 5B*
| Column Attribute | 1 | 2 | 3 | 4 |
|---|---|---|---|---|
| Amplitude (dB) | -7 | -1 | -1 | -7 |
| Phase | B +/- 180 | A | B | A +/- 180 |
| Beam 1 | 180 | 90 | 0 | -90 |
| Beam 2 | -90 | 0 | 90 | 180 |
*FIG. 5C*
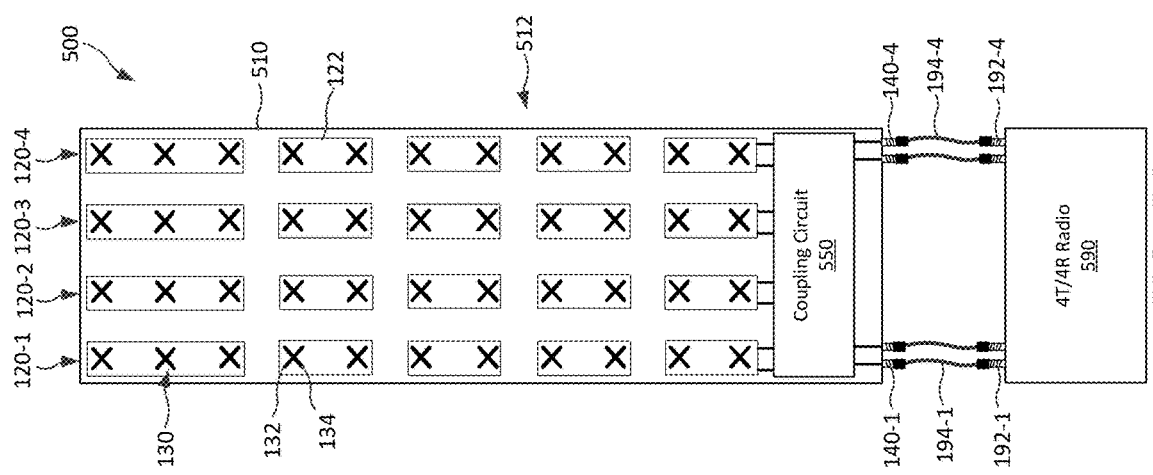
*FIG. 5A*

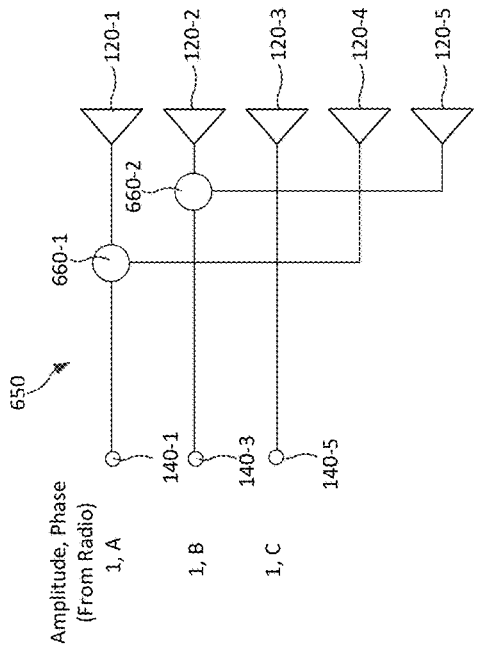
*FIG. 6B*
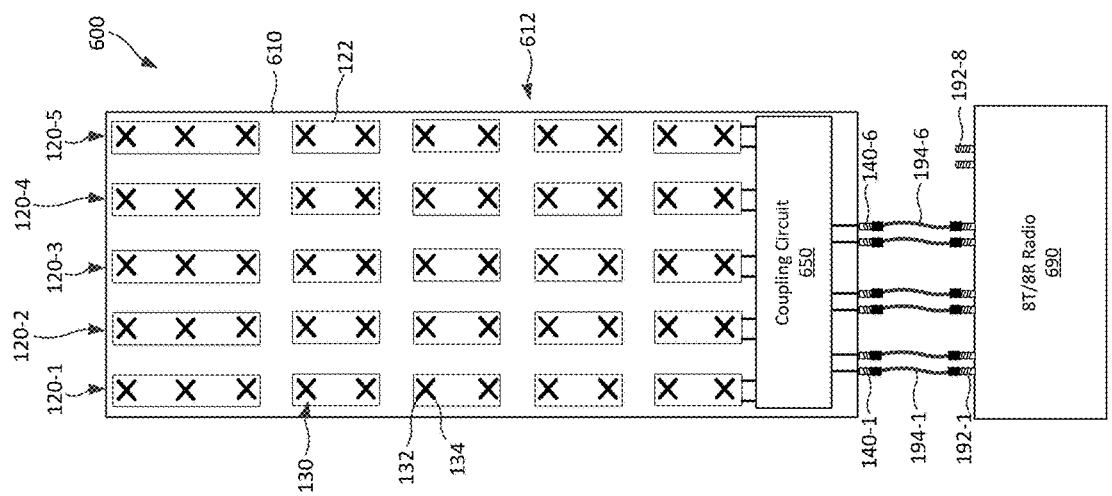
*FIG. 6C*
*FIG. 6A*

BEAMFORMING ANTENNAS THAT SHARE RADIO PORTS ACROSS MULTIPLE COLUMNS

CROSS-REFERENCE TO RELATED APPLICATION

The present application claims priority to PCT Application No. PCT/CN2020/111926, filed Aug. 27, 2020, the entire content of which is incorporated herein by reference.

BACKGROUND

The present invention generally relates to radio communications and, more particularly, to beamforming base station antennas for cellular communications systems.

Cellular communications systems are well known in the art. In a cellular communications system, a geographic area is divided into a series of regions or "cells" that are served by respective base stations. Each base station may include one or more base station antennas that are configured to provide two-way radio frequency ("RF") communications with subscribers that are within the cell served by the base station. In many cases, each base station is divided into "sectors." In one common configuration, a hexagonally-shaped cell is divided into three 120° sectors in the azimuth plane, and each sector is served by one or more base station antennas that have an azimuth Half Power Beamwidth ("HPBW") of approximately 65°. Typically, the base station antennas are mounted on a tower or other raised structure, with the radiation patterns that are generated by the base station antennas directed outwardly. Base station antennas are often implemented as linear or planar phased arrays of radiating elements.

In order to increase capacity, base station antennas that include beamforming arrays and/or that are configured to operate with multi-input-multi-output ("MIMO") radios have been introduced in recent years. A beamforming array refers to an antenna array that includes multiple columns of radiating elements. Beamforming arrays can generate antenna beams having reduced (narrower) beamwidths in, for example, the horizontal or "azimuth" plane, which increases the directivity or "gain" of the antenna, thereby increasing the supportable throughput. MIMO refers to a communication technique in which a data stream is broken into pieces that are simultaneously transmitted using certain coding techniques over multiple relatively uncorrelated transmission paths between a transmitting station and a receiving station. Multi-column antenna arrays may be used for MIMO transmissions, where each column in the array may be connected to a port of a MIMO radio and used to transmit/receive one of the multiple data streams. In practice, since orthogonal polarizations tend to be highly uncorrelated, the radiating elements in a MIMO array are typically implemented as dual-polarized radiating elements, allowing each column in the MIMO array to be connected to two ports on the radio (where the first port is connected to the first polarization radiators of the radiating elements in the column, and the second port connected to the second polarization radiators of the radiating elements in the column). This technique can effectively halve the number of columns of radiating elements required, since each physical column of the array contains two independent columns of radiators.

MIMO and beamforming techniques can also be combined. For example, so-called 8-Transmit/8-Receive ("8T8R") radios (which include eight radio ports) are now routinely connected to antenna arrays that include four columns of dual-polarized radiating elements that are configured to form a single antenna beam per polarization within a sector. The two polarizations may be used to implement 2×MIMO communications for each antenna beam. These beamforming antennas are typically used for time division duplex ("TDD") communications and may generate a single antenna beam during each individual time slot of the TDD communication scheme. Likewise, 16-Transmit/16-Receive ("16T16R") radios (which include sixteen radio ports) are known in the art that are connected to antenna arrays that include eight columns of dual-polarized radiating elements that are configured to form a single antenna beam at a time within a sector. The 16T16R solutions provide higher gain and less interference (and hence support higher data throughput) as compared to the 8T8R solution, but also require a larger array on the antenna and a much more expensive 16T16R radio, which can significantly increase cost.

SUMMARY

Pursuant to embodiments of the present invention, an antenna system may include a beamforming radio having a plurality of first polarization signal sources and a plurality of first polarization radio signal ports, where each first polarization signal source is coupled to all of the first polarization radio signal ports. The antenna system may include an antenna array having a plurality of columns of radiating elements. Moreover, the antenna system may include a coupling circuit that includes a coupler and/or splitter that connects one of the first polarization radio signal ports to at least two of the columns of radiating elements. For example, the splitter may be an RF power divider that connects the one of the first polarization radio signal ports to the at least two of the columns of radiating elements.

In some embodiments, a total number of the first polarization signal sources may be equal to a total number of the first polarization radio signal ports. Moreover, the coupling circuit may include another coupler and/or splitter that connects the one of the first polarization radio signal ports to at least two rows of the radiating elements.

According to some embodiments, the beamforming radio may include a total of X first polarization radio signal ports and the antenna array may include a total of Y columns of radiating elements, where X and Y are positive integers and Y is greater than X. For example, Y may be equal to 2*X. Moreover, a total number of couplers and/or splitters included in the coupling circuit that connect the first polarization radio signal ports to the columns of radiating elements in the antenna array may be equal to Y−X, and the coupler and/or splitter may connect the one of the first polarization radio signal ports to fewer than all of the columns of radiating elements.

In some embodiments, each first polarization signal source may be coupled to all of the columns of radiating elements. Moreover, the splitters may be RF power dividers that couple the Z first polarization antenna signal ports to the Y columns of radiating elements.

According to some embodiments, the coupling circuit may include a plurality of couplers and/or splitters that connect the first polarization radio signal ports to the columns of radiating elements in the antenna array. Moreover, the antenna system may include a plurality of first polarization antenna signal ports and a Butler Matrix beamforming network that is connected between the first polarization antenna signal ports and the coupling circuit.

Each coupler and/or splitter in the coupling circuit may, in some embodiments, only be coupled to two of the columns of radiating elements. Moreover, each coupler in the coupling circuit may be a four-port coupler having an input port that is coupled to a respective one of the first polarization radio signal ports, first and second output ports that are coupled to respective ones of the columns of radiating elements, and an isolation port that is coupled to a resistive termination.

In some embodiments, a hook balun of a radiating element in a first of the columns is flipped as compared to a hook balun of a radiating element in a second of the columns.

An antenna system, according to embodiments of the present invention, may include a beamforming radio having W first polarization signal sources and X first polarization radio signal ports, where W and X are positive integers, and where each first polarization signal source is coupled to all X of the first polarization radio signal ports. The antenna system may include an antenna including: an antenna array having Y columns of radiating elements, where Y is a positive integer that is greater than X; and Z first polarization antenna signal ports that are coupled to the antenna array, where Z is a positive integer. Moreover, the antenna system may include a coupling circuit that includes a plurality of couplers and/or splitters, the coupling circuit coupling the Z first polarization antenna signal ports to the Y columns of radiating elements.

In some embodiments, a total number of couplers and/or splitters included in the coupling circuit that couple the Z first polarization antenna signal ports to the Y columns of radiating elements in the antenna array may be equal to Y−Z.

According to some embodiments, each first polarization signal source may be coupled to all Y columns of radiating elements.

In some embodiments, each coupler and/or splitter in the coupling circuit may only be coupled to two of the columns of radiating elements.

According to some embodiments, each coupler in the coupling circuit may be a four-port coupler having an input port that is coupled to a respective one of the first polarization radio signal ports, first and second output ports that are coupled to respective ones of the columns of radiating elements, and an isolation port that is coupled to a resistive termination.

In some embodiments, W may be equal to X.

According to some embodiments, Z may be less than Y.

In some embodiments, the antenna system may include a Butler Matrix beamforming network that is connected between the Z first polarization antenna signal ports and the coupling circuit.

A base station antenna system, according to embodiments of the present invention, may include a beamforming array having a plurality of vertical columns of radiating elements that are each configured to transmit at least three antenna beams per polarization. Moreover, the base station antenna system may include a beamforming radio having a plurality of radio signal ports per polarization that are coupled to and fewer than the vertical columns. For example, the vertical columns may include at least five vertical columns, and the radio signal ports may include no more than eight radio signal ports that are coupled to the at least five vertical columns. In another example, the vertical columns may include at least five vertical columns, and the radio signal ports may include no more than six radio signal ports that are coupled to the at least five vertical columns. As a further example, the vertical columns may include at least six vertical columns, and the radio signal ports may include no more than ten radio signal ports that are coupled to the at least six vertical columns.

In some embodiments, the no more than ten radio signal ports of the beamforming radio may include no more than five radio signal ports per polarization that are coupled to the at least six vertical columns. Moreover, the beamforming radio may include a plurality of RF signal sources per polarization that are each coupled to all of the no more than five radio signal ports.

According to some embodiments, the base station antenna system may include analog RF circuitry that is coupled between the beamforming radio and two of the vertical columns.

In some embodiments, the analog RF circuitry may include an RF coupler and/or splitter. Also, the two vertical columns may be non-adjacent vertical columns, and RF outputs of the RF coupler and/or splitter may be coupled only to the non-adjacent vertical columns. Moreover, a first output of the RF coupler and/or splitter may be fed to a first of the vertical columns with a first phase, and a second output of the RF coupler and/or splitter may be fed to a second of the vertical columns with a second phase that is offset by 180 degrees from the first phase.

According to some embodiments, the beamforming array may be part of a base station antenna that includes a plurality of antenna signal ports. The base station antenna system may further include analog RF circuitry that is coupled between the beamforming radio and a pair of the vertical columns. The analog RF circuitry may be configured to couple an RF signal received at a first of the antenna signal ports to at least two of the vertical columns. For example, the analog RF circuitry may be inside the base station antenna. As another example, the analog RF circuitry may be external to the base station antenna.

In some embodiments, the analog RF circuitry may include an RF coupler and/or splitter that splits an RF signal input to the RF coupler and/or splitter from the first of the antenna signal ports into first and second sub-components. A first output of the RF coupler and/or splitter may be fed to a first of the vertical columns with a first phase, and a second output of the RF coupler and/or splitter may be fed to a second of the vertical columns with a second phase that is offset by 180 degrees from the first phase.

According to some embodiments, the beamforming radio may include at least four RF signal sources per polarization. Each of the at least four RF signal sources may be configured to generate a respective RF component of each of the at least three antenna beams. Moreover, the beamforming radio may be configured to control each of the at least four RF signal sources to individually turn on or off each of the at least three antenna beams.

An antenna system, according to some embodiments of the present invention, may include a beamforming radio having a plurality of first polarization signal sources and a plurality of first polarization radio signal ports, where each first polarization signal source is coupled to all of the first polarization radio signal ports. The antenna system may include an antenna array having a plurality of columns and a plurality of rows of radiating elements. Moreover, the antenna system may include a coupling circuit that includes a coupler and/or splitter that connects one of the first polarization radio signal ports to at least two of the rows of radiating elements. For example, the splitter may be an RF power divider that connects the one of the first polarization radio signal ports to the at least two of the rows of radiating elements.

A massive MIMO base station antenna system, according to some embodiments of the present invention, may include at least thirty-six groups, each of which includes a plurality of radiating elements. The massive MIMO base station antenna system may include a beamforming radio having fewer than sixty-four radio signal ports that are coupled to the antenna array. Moreover, the massive MIMO base station antenna system may include a coupling circuit that couples a first of the radio signal ports to at least two of the groups.

In some embodiments, the beamforming radio may be a 32T32R beamforming radio.

According to some embodiments, each group may include exactly two radiating elements, and the antenna array may have at least six columns and at least six rows of the groups.

In some embodiments, each group may include exactly three radiating elements, and the antenna array may have eight columns and four rows of the groups.

According to some embodiments, a sub-array of the antenna array may include sixteen of the groups.

In some embodiments, a first row of the groups may include a first group of the sub-array and a second group that is outside of the sub-array. Moreover, the coupling circuit may couple the first group to the second group.

According to some embodiments, a first column of the groups may include a first group of the sub-array and a second group that is outside of the sub-array. Moreover, the coupling circuit may couple the first group to the second group.

In some embodiments, a first group of the sub-array may be in a first row and a first column of the groups. A second group that is outside of the sub-array may be in a second row and a second column of the groups. Moreover, the coupling circuit may couple the first group to the second group.

According to some embodiments, the coupling circuit may be an RF power divider.

In some embodiments, the coupling circuit may couple the first of the radio signal ports of the beamforming radio to multiple rows and multiple columns of the groups.

BRIEF DESCRIPTION OF THE DRAWINGS

FIG. 1A is a schematic front view of a conventional antenna system that includes an 8T8R radio and an antenna array that includes four columns of dual-polarized radiating elements.

FIG. 1B is a table illustrating the relative amplitudes and phases applied to the signals fed to the four columns of the antenna array of FIG. 1A in order generate eight antenna beams (four at each polarization).

FIG. 3C is a table illustrating the relative amplitudes and phases applied to the signals fed to the four columns of the antenna array of FIG. 3A via the coupling circuit of FIG. 3B in order generate eight antenna beams (four at each polarization).

FIG. 3E is a table illustrating the relative amplitudes and phases applied to the signals fed to the four columns of the antenna array of FIG. 3A via the coupling circuit of FIG. 3D in order generate eight antenna beams (four at each polarization).

FIG. 4C is a table illustrating the relative amplitudes and phases applied to the signals fed to the eight columns of the antenna array of FIG. 4A via the coupling circuit of FIG. 4B in order generate the ten antenna beams (five at each polarization).

FIG. 5A is a schematic front view of an antenna system according to embodiments of the present invention that includes a 4T4R radio, a coupling circuit, and an antenna array that includes four columns of dual-polarized radiating elements.

FIG. 5B is a schematic diagram illustrating a coupling circuit according to embodiments of the present invention that can be used to couple the 4T4R radio of FIG. 5A to the four-column antenna array of FIG. 5A.

FIG. 5C is a table illustrating the relative amplitudes and phases applied to the signals fed to the four columns of the antenna array of FIG. 5A via the coupling circuit that is shown in FIG. 5B in order generate four antenna beams (two at each polarization).

FIG. 6A is a schematic front view of an antenna system according to embodiments of the present invention that includes a 8T8R radio, a coupling circuit, and an antenna array that includes five columns of dual-polarized radiating elements.

FIG. 6B is a schematic diagram illustrating a coupling circuit according to embodiments of the present invention that can be used to couple the 8T8R radio of FIG. 6A (with two ports unused) to the five-column antenna array of FIG. 6A.

FIG. 6C is a table illustrating the relative amplitudes and phases applied to the signals fed to the five columns of the antenna array of FIG. 6A via the coupling circuit that is shown in FIG. 6B in order generate the four antenna beams (two at each polarization).

DETAILED DESCRIPTION

Figure 2A:
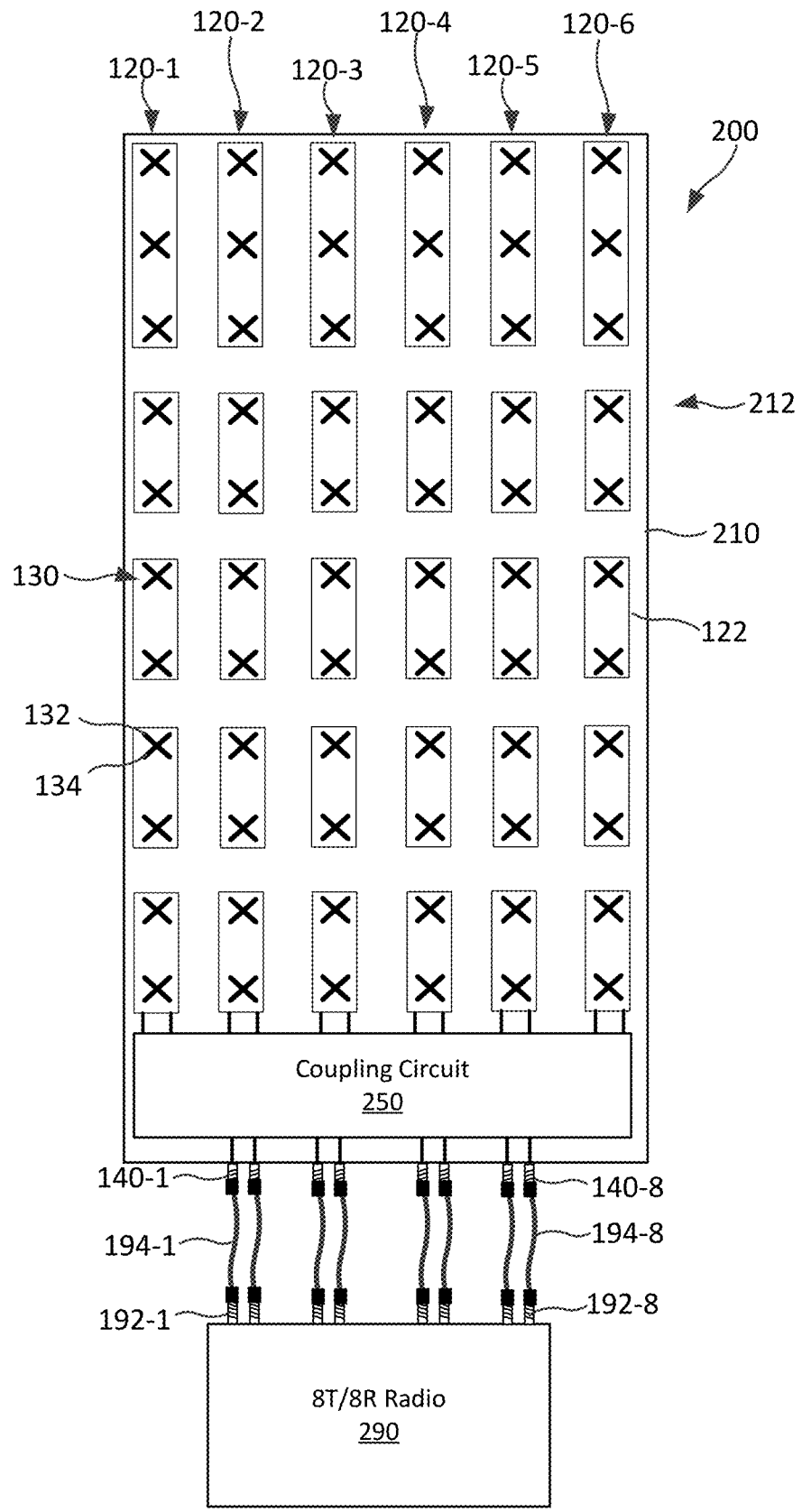
FIG. 2A is a schematic front view of an antenna system according to embodiments of the present invention that includes an 8T8R radio, a coupling circuit, and an antenna array that includes six columns of dual-polarized radiating elements.

Pursuant to embodiments of the present invention, antenna systems (e.g., base station antenna systems) are provided that include antenna arrays that have multiple columns of radiating elements, where at least some of the columns are coupled to the same RF ports of a radio (herein "radio signal ports"). The radiating elements may be dual-polarized radiating elements so that the multi-column antenna array may generate multiple antenna beams at each polarization. In example embodiments, an eight-column (or six-column) antenna array may be fed by a radio that has fewer than eight (or fewer than six) radio signal ports per polarization. In particular, a coupling circuit that may include analog RF components, such as RF couplers and/or splitters, may couple at least some of the radio signal ports to respective pairs of columns of the antenna array. As a result, the radio may include fewer radio signal ports (per polarization) than there are columns of the antenna array. This allows the antenna systems according to embodiments of the present invention to provide improved antenna patterns and higher gains while using relatively inexpensive radios.

As discussed above, conventionally, 8T8R TDD beamforming radios are used in conjunction with antenna arrays having four columns of dual-polarized radiating elements. This implementation provides a relatively low cost beamforming solution, but may suffer from low gain (and hence low capacity) and relatively coarse antenna patterns that are not ideal. If higher performance is required, 16T16R TDD beamforming radios may be used in conjunction with antenna arrays having eight columns of dual-polarized radiating elements. This implementation provides increased gain, improved antenna beams and supports higher capacity, but may be significantly more expensive. Pursuant to embodiments of the present invention, antenna systems are provided that may, for example, include an 8T8R TDD beamforming radio in conjunction with antenna arrays having more than four columns of dual-polarized radiating elements (e.g., six columns or eight columns). This implementation provides increased gain and improved antenna beams as compared to the low cost solution discussed above, although not quite as good of performance as the high capacity solution. The antenna systems according to embodiments of the present invention thus may provide an intermediate solution that may be acceptable for many applications that previously required the high cost solution.

Embodiments of the present invention will now be discussed in greater detail with reference to the attached figures.

FIG. 1A is a schematic front view of a conventional antenna system 100 that includes an 8T8R radio 190 and an antenna 110 having an antenna array 112 that includes four columns 120-1 through 120-4 of dual-polarized radiating elements 130. Each radiating element 130 may comprise, for example, a crossed-dipole radiating element that includes a first dipole radiator 132 and a second dipole radiator 134 that crosses/intersects the first dipole radiator 132. The dipole radiators 132 and 134 each have two dipole "arms." Each column 120 includes one or more groups 122 (e.g., one or more sub-arrays) of radiating elements 130. Note that herein when multiple like elements are provided, they may be numbered using two-part reference numerals. These elements may be referred to individually by their full reference numeral (e.g., column 120-3), and may be referred to collectively by the first part of their reference numeral (e.g., the columns 120).

The array of columns 120 may be inside a radome of the antenna 110 (not shown). The antenna 110 may include RF ports 140-1 through 140-8, which may also be referred to herein as "connectors" or "antenna signal ports," that are coupled (e.g., electrically connected) to the columns 120. In particular, antenna signal ports 140-1, 140-3, 140-5 and 140-7 are coupled to the first radiators 132 of the radiating elements 130 of columns 120-1, 120-2, 120-3 and 120-4, respectively, and antenna signal ports 140-2, 140-4, 140-6 and 140-8 are coupled to the second radiators 134 of the radiating elements 130 of columns 120-1, 120-2, 120-3 and 120-4, respectively. As is further shown in FIG. 1A, the antenna signal ports 140 are also coupled to respective radio signal ports 192 of the radio 190 by respective RF transmission lines 194-1 through 194-8, such as coaxial cables. For example, the radio 190 may be a TDD beamforming radio for a cellular base station, and the antenna 110 and the radio 190 may be located at (e.g., may be components of) a cellular base station.

Because the radio 190 is shown as an 8T8R radio, it includes eight RF ports 192-1 through 192-8 that pass RF communication signals between the internal components of the radio 190 and the antenna array 112. These ports 192 may also be referred to herein as "radio signal ports." For example, four of the radio signal 192 may be first polarization ports and another four of the radio signal 192 may be second polarization ports, where the first and second polarizations are different polarizations. The radio 190 may also include one or more calibration ports (not shown) that are not radio signal ports, but instead are ports that may be used in calibrating the internal circuitry of the radio 190 to account for amplitude and phase differences between the RF signal paths external to the radio 190.

The 8T8R radio 190 includes four RF first polarization signal sources and four second polarization signal sources. Each first polarization RF signal source in radio 190 is coupled to the four first polarization radio signal ports (here radio signal ports 192-1, 192-3, 192-5, 192-7), and each second polarization RF signal source in radio 190 is coupled to the four second polarization radio signal ports (here radio signal ports 192-2, 192-4, 192-6, 192-8).

FIG. 1B is a table illustrating the relative amplitudes and phases applied to the RF signals fed to the four columns of the antenna array of FIG. 1A in order generate eight antenna beams (four at each polarization). The table of FIG. 1B only illustrates the relative amplitudes and phases of the RF signals fed to the first polarization radiators 132 of the columns 120. It will be appreciated that the same relative amplitudes and phases of the RF signals fed to the first polarization radiators 132 of the columns 120.

In FIG. 1B, the rows labeled "Beam X" (X=1, 2, 3, 4) show the relative phases of the four RF signals that are provided to the first radiators 123 of the radiating elements 130 in the four columns 120. Thus, for example, the first signal source (Beam 1) outputs a signal having a relative amplitude of 0 dB and a relative phase of −405 to the radiators 132 of the first column 120-1, outputs a signal having a relative amplitude of 0 dB and a relative phase of −270 to the radiators 132 of the second column 120-1, outputs a signal having a relative amplitude of 0 dB and a relative phase of −135 to the radiators 132 of the third column 120-3, and outputs a signal having a relative amplitude of 0 dB and a relative phase of 0 to the radiators 132 of the fourth column 120-4. The four RF signals output by the first signal source in radio 190 to the four columns 120-1 through 120-4 as described above generate a first antenna beam that points in a first direction in the azimuth plane. The second, third and fourth signal sources in radio 190 generate second, third and fourth antenna beams that point in three additional directions in the azimuth plane.

FIG. 1B also shows the phases that may be applied by the radio 190 in order to generate a so-called "broadcast" beam. As is known in the art, a broadcast beam refers to a beam that is formed by a beamforming antenna that is a wide beamwidth beam that is designed to cover the entire coverage area that is served by the antenna system. The broadcast beam is a single beam that is used to communicate with all users throughout the coverage area.

FIG. 2A is a schematic front view of an antenna system 200 according to embodiments of the present invention that includes an 8T8R radio 290 (e.g., a TDD beamforming radio), a coupling circuit 250, and an antenna 210 having antenna array 212 that includes six columns 120-1 through 120-6 of dual-polarized radiating elements 130. It will be appreciated that the antenna system 200 may include additional columns of radiating elements (not shown).

The antenna 210 may include antenna signal ports 140 that are coupled to the columns 120. The antenna signal ports 140 are also coupled to respective radio signal ports 192 of the radio 290 by RF transmission lines 194. The radio 290 may be a TDD beamforming radio, and the antenna 210 and the radio 290 may be located at (e.g., may be components of) a cellular base station.

The columns 120 may be referred to herein as "vertical" columns, as they may extend in a vertical direction from a lower portion of the antenna 210 to an upper portion of the antenna 210. The vertical direction may be, or may be parallel with, a longitudinal axis of the antenna 210, which may be perpendicular to the horizon. As used herein, the term "vertical" does not necessarily require that something is exactly vertical (e.g., the antenna 210 may have a small mechanical down-tilt). Additionally, in the depicted embodiment, the radiating elements 132 are arranged in true rows and columns. It will be appreciated that in many cases every other column 120 may be offset in the vertical direction so that every column 120 is "staggered" in the vertical direction with respect to its one or more adjacent columns 120. This "staggered" approach may increase the distance between radiating elements 132 in adjacent columns 120 and hence improve the isolation between adjacent columns 120.

The coupling circuit 250 connects (e.g., electrically connects) the antenna signal ports 140 to the columns 120. Specifically, the coupling circuit 250 is configured to split an RF signal that is input to a first of the antenna signal ports 140 into two sub-components and to feed the two sub-components of this RF signal to the first polarization radiators 132 of the radiating elements 130 in respective first and second of the columns 120. The coupling circuit 250 is further configured to split an RF signal that is input to a second of the antenna signal ports 140 into two sub-components and to feed the two sub-components of this RF signal to the first polarization radiators 132 of the radiating elements 130 in respective third and fourth of the columns 120. The coupling circuit 250 is likewise configured to similarly split RF signals that are input to third and fourth of the antenna signal ports 140 into respective pairs of sub-components and to feed those sub-components to the second polarization radiators 130 of the radiating elements 130 in a similar fashion. The coupling circuit 250 may comprise various types of analog RF circuitry, such as a plurality of RF couplers and/or a plurality of RF splitters/combiners (e.g., RF power dividers). Though shown in FIG. 2A as being inside the antenna 210, the coupling circuit 250 may, in some embodiments, be external to the antenna 210. As an example, the coupling circuit 250 may be a standalone device that is coupled between (a) the radio signal ports 192 and (b) the antenna signal ports 140.

Because the radio 290 is shown as an 8T8R radio, it includes eight radio signal ports 192-1 through 192-8. Four of the radio signal ports 192 may be first polarization ports and another four of the radio signal ports 192 may be second polarization ports, where the first and second polarizations are different polarizations. As will be discussed below, other radios having different numbers of radio signal ports may be used in other embodiments. For example, in some embodiments, a 4T4R radio having four radio signal ports or a 10T10R radio having ten radio signal ports 192 (e.g., five first polarization radio signal ports and five second polarization radio signal ports) may be used instead of the 8T8R radio 290.

The number of columns 120 of dual-polarized radiating elements 130 included in antenna 210 exceeds the number of first polarization radio signal ports 192 included on radio 290. In order utilize all six columns 120 at both polarizations, at least some of the radio signal ports 192 are shared across multiple (here two) columns 120 using the coupling circuit 250. Thus, by providing the coupling circuit 250, the correspondence between the number of columns and the number of first (or second) polarization radio signal ports on the beamforming radio may be broken, and hence the antenna 210 may include five, six, seven, eight, or more columns 120, even though the radio 290 only has four radio signal ports 192 per polarization.

Butler Matrices have been used in the past to couple radio signal ports to a multi-column antenna array, where the number of radio signal ports per polarization did not necessarily equal the number of columns of radiating elements in the antenna array. However, such conventional techniques were used with multiple standard frequency division duplex ("FDD") radios to form multiple static antenna beams for sector-splitting operations. Each radio signal port was connected to a single signal source, and the Butler Matrix was used to split and phase shift the RF signals provided by each signal source so as to feed the RF signals to all of the columns in the antenna array. This typically required a series of layers of hybrid couplers or other analog circuit elements that could significantly increase the insertion loss of the antenna. Pursuant to embodiments of the present invention, beamforming radios may be used that feed combined signal sources in the digital domain so that each radio signal port may output sub-components of the RF signals generated by multiple signal sources. A small number of additional analog components (e.g., hybrid couplers or Wilkinson power dividers) may then be used to further sub-divide the RF signals output at one or more of the radio signal ports so that all of the columns 120 of the antenna array 212 are fed. In other words, the radio 290 may perform some beamforming RF signal operations in a digital domain, thereby simplifying antenna system hardware and improving insertion loss. For example, as will be discussed below with reference to FIG. 7B, in one example embodiment the radio 290 may include four RF signal sources 715 and may be configured to combine the RF signals generated by all four signal sources 715 before outputting the combined signal from a radio signal port 192. Each of the signal sources 715 may be coupled to all of the radio signal ports 192 and may be configured to generate a respective RF signal component 716 of each antenna beam that the columns 120 transmit, and the radio 290 may be configured to control each of the signal sources 715 to individually turn on or off each antenna beam.

Figures 2B, 2C:
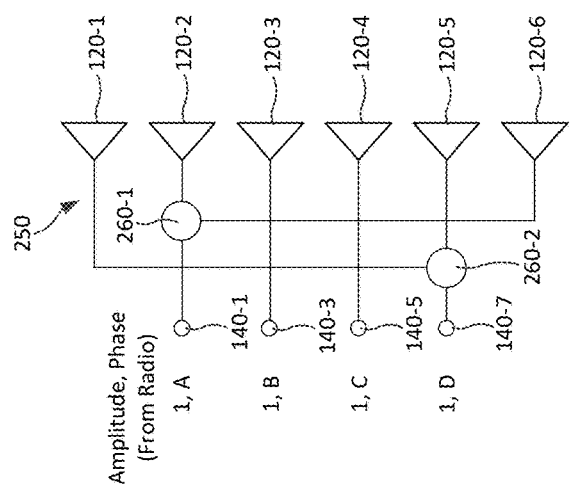
FIG. 2B is a schematic diagram illustrating a coupling circuit according to embodiments of the present invention that can be used to couple the 8T8R radio of FIG. 2A to the six-column antenna array of FIG. 2A.
FIG. 2C is a table illustrating the relative amplitudes and phases applied to the signals fed to the six columns of the antenna array of FIG. 2A in order generate eight antenna beams (four at each polarization).

Though the system 200 has only one radio 290, antenna systems according to other embodiments of the present invention may include multiple radios that are coupled to the same antenna array. For example, additional radios and diplexers could be provided to provide a frequency division duplex ("FDD") twin-beam or tri-beam or quad-beam antenna system that operated in a different sub-band of the operating frequency range of the radiating elements 130 so that the antenna array 212 may be used as a TDD beamforming array in the first sub-band and as an FDD sector splitting array in the second sub-band FIG. 2B is a schematic diagram illustrating a coupling circuit 250 according to embodiments of the present invention that can be used to couple the 8T8R radio 290 of FIG. 2A to the six-column antenna array 212 of FIG. 2A. As shown in FIG. 2B, the coupling circuit 250 may include first and second couplers and/or splitters 260-1 and 260-2. The first coupler and/or splitter 260-1 connects (e.g., electrically connects) a first antenna signal port 140-1 to both a second column 120-2 and a sixth column 120-6. Similarly, the second coupler and/or splitter 260-2 connects a seventh antenna signal port 140-7 to both a first column 120-1 and a fifth column 120-5.

The ports 140-1 and 140-7, as well as ports 140-3 and 140-5, may be first polarization ports. For simplicity of illustration, second polarization antenna signal ports 140-2, 140-4, 140-6, and 140-8 are omitted from view in FIG. 2B. An identical coupling circuit 250 may be used to couple the second polarization antenna signal ports 140-2, 140-4, 140-6, and 140-8 to the six columns 120-1 through 120-6 of antenna array 212. Moreover, in some embodiments, the coupling circuit 250 may be external to the antenna 210, and the couplers and/or splitters 260 may thus couple radio signal ports 192 to respective pairs of antenna signal ports 140.

The couplers and/or splitters 260-1 and 260-2 are coupled to respective non-adjacent pairs of columns 120. As used herein with respect to columns 120, the term "non-adjacent" refers to two columns 120 that have least one other column 120 therebetween. For example, FIG. 2B shows that each commonly-coupled pair has three columns 120 therebetween. Accordingly, the same distance can separate each commonly-coupled pair.

In some embodiments, the couplers and/or splitters 260-1 and 260-2 may be respective analog RF couplers. Herein, the term "coupling circuit" is used to cover a wide variety of power coupling and/or splitting devices, including four-port devices such as hybrid couplers, branch line couplers, rat race couplers, and the like, and three-port devices such as Wilkinson power couplers/dividers and the like.

Moreover, a coupling circuit according to other embodiments may include more than two couplers and/or splitters that are coupled to respective pairs of columns 120. In some embodiments, the total number of couplers and/or splitters (in a coupling circuit) that couple X first polarization antenna signal ports 192 to Y columns 120 (via Z first polarization antenna signal ports 140 (FIG. 2A) of an antenna) may be equal to Y−X and/or may be equal to Y−Z, where X, Y and Z are positive integers and Y is larger than both X and Z. In some embodiments, the total number of couplers and/or splitters may be equal to X. As a result, Y may equal 2*X in some embodiments and RF outputs of each coupler and/or splitter may thus be coupled to only (i.e., exactly) two columns 120. In other embodiments, a 4×4 Butler matrix may be used that includes 4 couplers that connect Z=4 ports 140 with Y=4, 6, or 8 columns 120.

In some embodiments, the radio 290 may include W first polarization signal sources that are each coupled to all of the X radio signal ports 192. Each first polarization signal source may also be coupled by the coupling circuit 250 to all of the Y columns 120 of the antenna array 212.

Each coupler and/or splitter 260 may, in some embodiments, be a four-port coupler having (i) an RF input port that is coupled to a respective one of the X radio signal ports 192, (ii) a first RF output port that is coupled to one of the Y columns 120, (iii) a second RF output port that is coupled to another of the Y columns 120, and (iv) an isolation port that is coupled to a resistive termination (e.g., a 50-Ohm resistor).

In some embodiments, the orientation of the hook baluns on the dipole radiators 132, 134 of the radiating elements 130 included in columns 120-1 and 120-6 may be reversed as compared to the orientation of the hook baluns on the dipole radiators 132, 134 of the radiating elements 130 included in columns 120-2 through 120-5. By reversing or "flipping" the hook baluns on dipole radiators 132, 134 of the radiating elements 130 (FIG. 2A), the phases of the RF signals fed to the radiating elements 130 of columns 120-1 and 120-6 may be shifted by 180 degrees relative to the phases of the RF signals fed to the radiating elements 130 of columns 120-2 and 120-5. Moreover, in some embodiments, the columns 120 may be spaced apart by about 0.5 wavelengths at the operating frequency (e.g., by at least 62 millimeters ("mm")).

The antenna system 200 may provide improved performance as compared to the conventional antenna system 100 of FIG. 1A. In particular, since the antenna array 212 includes six columns 120 of radiating elements (versus the four columns 120 included in antenna system 100) the gain of antenna array 212 may be approximately 0.4 dB greater than the gain of antenna array 112. Additionally, the antenna beams (e.g., at least three beams per polarization) generated by antenna array 212 may exhibit improved roll-off as compared to the antenna beams generated by antenna array 112.

FIG. 2C is a table illustrating the relative amplitudes and phases applied to the signals fed to the six columns of the beamforming antenna array of FIG. 2A in order generate eight antenna beams (four at each polarization). The table of FIG. 2C may be interpreted in the same fashion as described above with reference to the similar table of FIG. 1B. The amplitudes shown for columns 1, 2, 5, and 6 are merely examples. Accordingly, a different amplitude ratio can be provided between the couplers and/or splitters 260-1 and 260-2.

As shown in FIG. 2C, two columns 120 that are commonly coupled to a coupler and/or splitter 260 may transmit 180 degree phase-shifted versions of the same signal. For example, the fifth column 120-5 may transmit a signal having a phase "D" while the first column 120-1 may transmit an RF signal having a phase of D +/−180 degrees. Similarly the second column 120-2 may transmit a signal having a phase "A" while the sixth column 120-6 may transmit an RF signal having a phase of A +/−180 degrees.

These phase offsets, however, may not necessarily be exactly 180 degrees. In particular, the phase offsets can be adjusted via a phase shifter so that they are not exactly 180 degrees. This can allow different beamforming possibilities, and can avoid having sub-array patterns for coupled columns 120 that have local minima at given angles. More precisely, though the minima may still exist, control can be provided over where they occur.

Moreover, each antenna beam may be transmitted with a different respective phase for all of the columns 120. As an example, the RF signals fed to the six columns 120 to form the first antenna beam (Beam 1 in FIG. 2C) may have phases of −540 degrees, −405 degrees, −270 degrees, −135 degrees, 0, and +135 degrees at the columns 120-1 through 120-6, respectively. The phases do not, however, have to be in an arithmetic sequence and thus can be widely adjusted. Also, different antenna beams may be transmitted with different sets of phases for the columns 120, as is further shown in the table of FIG. 2C.

It should also be noted that the amplitudes of the signals are fed to the different columns 120. In particular, the RF signals fed to columns 120-3 and 120-4 may have a relative amplitude of 0 dB since these signals are not passed through a coupler and/or splitter. The couplers and/or splitters 260 may be implemented as four-port hybrid couplers, which may be assumed to have an insertion loss of, for example, 1 dB. The smaller signal output by each coupler and/or splitter 260 is fed to the outer column 120, and hence the signals fed to columns 120-1 and 120-6 may have relative amplitudes of −4.76 dB (i.e., an insertion loss of 1 dB and the coupler and/or splitter 260 reduces the magnitude of the signal by an additional 3.76 dB), and the signals fed to columns 120-2 and 120-5 may have relative amplitudes of −1.76 dB (i.e., an insertion loss of 1 dB and the coupler and/or splitter 260 reduces the magnitude of the signal by an additional 0.76 dB).

Each antenna beam (i.e., Beam 1 through Beam 4 in FIG. 2C) may provide coverage to a different portion of a 120 degree sector in some embodiments. Moreover, these antenna beams may be referred to herein as "switched" or "switchable" beams because they can be selectively transmitted to one or more particular sectors. For example, the beamforming radio 290 may generate only one antenna beam (e.g., Beam 1 or Beam 3, as two examples) during a first time slot of the TDD communication frame, and may generate more than one antenna beam during other time slots (e.g., two antenna beams, three antenna beams, or all four antenna beams).

In some embodiments, the antenna array 212 (or any of the other antenna arrays according to embodiments of the present invention that are described herein) may be designed to operate in multiple sub-bands of an operating frequency band of the radiating elements 130. For example, the radiating elements 130 may be designed to operate in the 2.2-2.7 GHz operating frequency band (or the 1.7-2.7 GHz operating frequency band). In such embodiments, the antenna array 212 may be designed to operate in either or both the 2.3 GHz sub-band or the 2.6 GHz sub-band, for example. In such an embodiment, the antenna array could be coupled to a 2.3 GHz TDD beamforming radio for operation in the 2.3 GHz sub-band, or could be coupled to a 2.6 GHz TDD beamforming radio for operation in the 2.6 GHz sub-band. Alternatively, diplexers could be used (which could be either internal to the antenna 210 or external to the antenna 210) that allow both a 2.3 GHz TDD beamforming radio and a 2.6 GHz TDD beamforming radio to simultaneously transmit and receive RF signals through the antenna array 212. In such embodiments, the spacing between adjacent columns may be selected so that the distance between adjacent columns is close to 0.5 wavelengths in both operating frequency bands. For example, a spacing of 62 mm between adjacent columns corresponds to 0.47 wavelengths at 2.3 GHz and to 0.54 wavelengths at 2.6 GHz, which represents a compromise in order to obtain good (but not ideal) performance in both sub-bands.

As is further shown in FIG. 2C, the antenna system 200 can also generate a broadcast beam that provides coverage to the full coverage area of the antenna 210. This broadcast beam may be used to, for example, transmit common control signals to all of the users within the coverage area of the antenna 210. It will be appreciated that each of the antenna systems according to embodiments of the present invention may be configured to generate such broadcast beams.

Figure 3A:
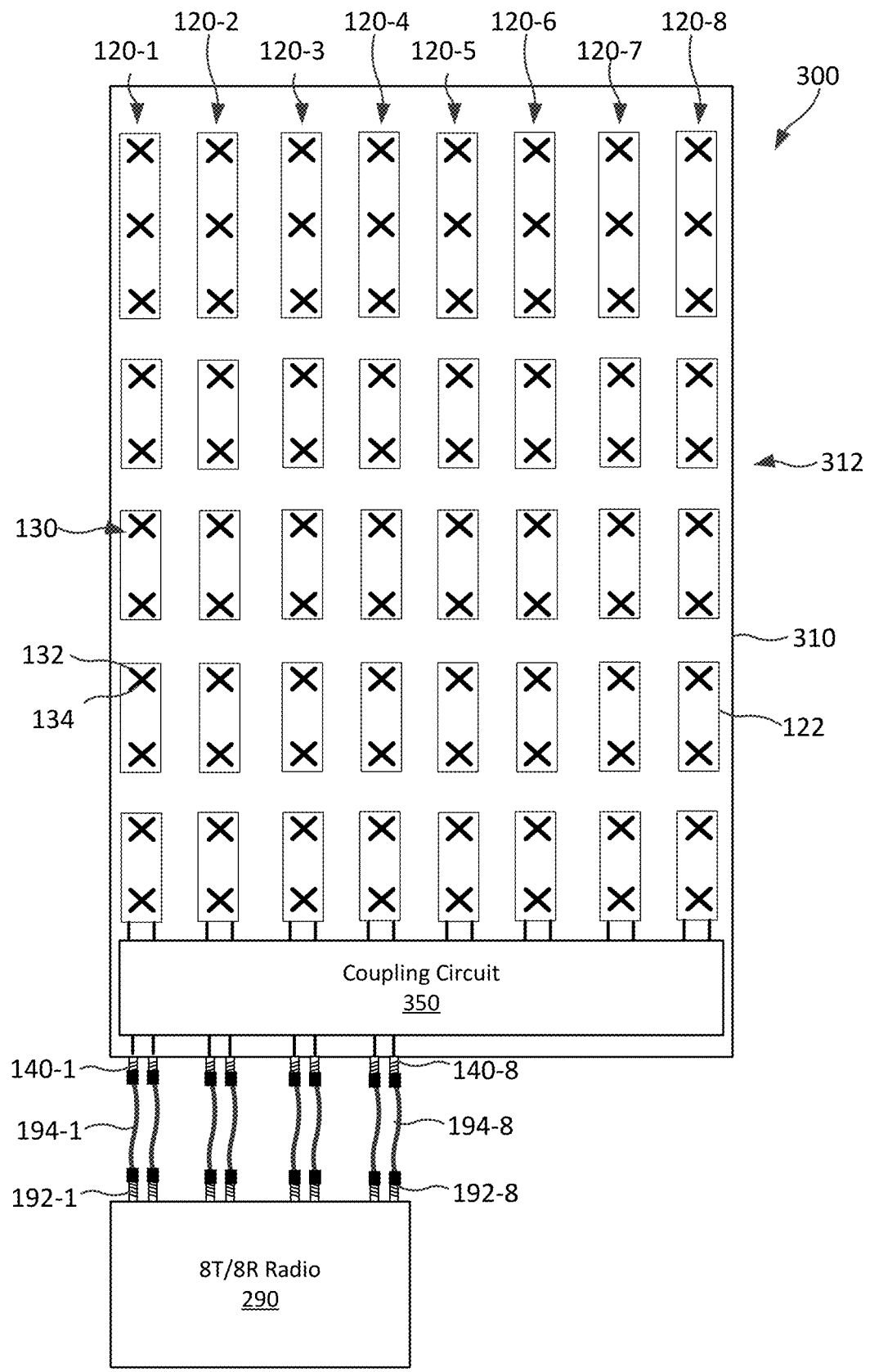
FIG. 3A is a schematic front view of an antenna system according to embodiments of the present invention that includes an 8T8R radio, a coupling circuit, and an antenna array that includes eight columns of dual-polarized radiating elements.

FIG. 3A is a schematic front view of an antenna system 300 according to embodiments of the present invention that includes an 8T8R radio 290, a coupling circuit 350, and an antenna 310 having an antenna array 312 that includes eight columns 120-1 through 120-8 of dual-polarized radiating elements 130. The antenna array 312 thus includes two more columns 120 than the antenna array 212 (FIG. 2A) and four more than the antenna array 112 (FIG. 1A). Accordingly, the coupling circuit 350 may include more couplers and/or splitters than the coupling circuit 250 (FIG. 2A). Moreover, to improve azimuth side lobes (e.g., by about 2-3 decibels ("dB")), one or more outer columns 120-1, 120-2, 120-7, and 120-8 may include fewer radiating elements 130 than inner columns 120-3 through 120-6.

Figure 3D:
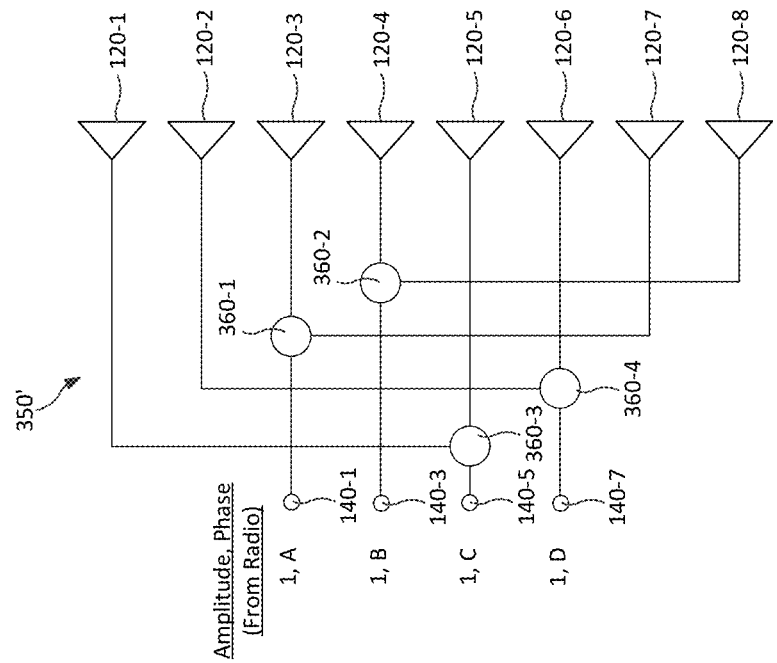
FIG. 3D is a schematic diagram illustrating another coupling circuit according to embodiments of the present invention that can be used to couple the 8T8R radio of FIG. 3A to the eight-column antenna array of FIG. 3A.
Figure 3B:
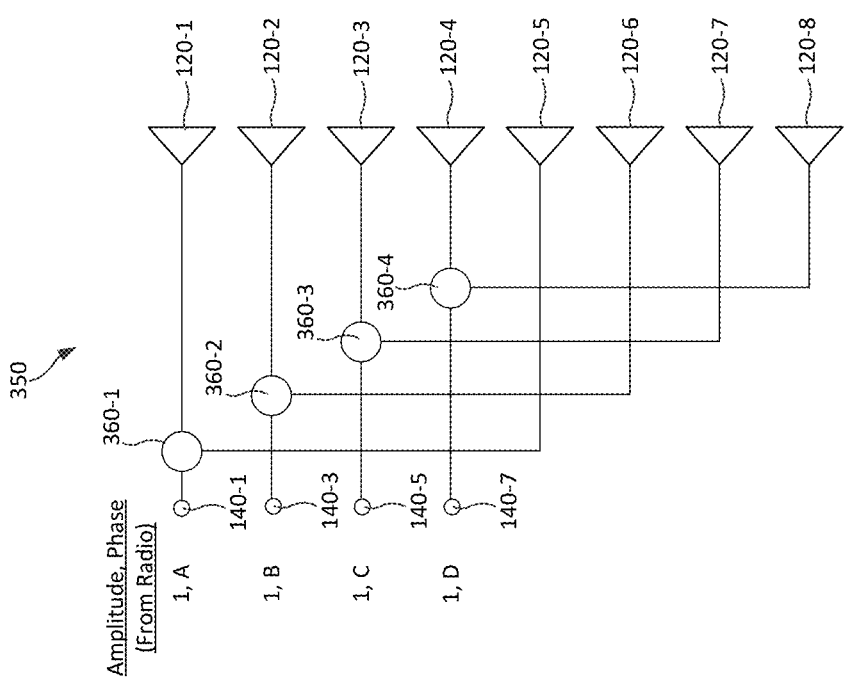
FIG. 3B is a schematic diagram illustrating a coupling circuit according to embodiments of the present invention that can be used to couple the 8T8R radio of FIG. 3A to the eight-column antenna array of FIG. 3A.

FIG. 3B is a schematic diagram illustrating a coupling circuit 350 according to embodiments of the present invention that can be used to couple the 8T8R radio 290 of FIG. 3A to the eight-column antenna array of FIG. 3A. The coupling circuit 350 may include four couplers and/or splitters 360-1 through 360-4. Each of the couplers and/or splitters 360 may electrically connect a respective radio signal port 192 of the radio 290 (via a respective antenna signal port 140 of the antenna 310) to a pair of columns 120.

The first coupler and/or splitter 360-1 connects a first antenna signal port 140-1 of the antenna 310 to both the first column 120-1 and the fifth column 120-5. The second coupler and/or splitter 360-2 connects a third antenna signal port 140-3 of the antenna 310 to both the second column 120-2 and the sixth column 120-6. The third coupler and/or splitter 360-3 connects a fifth antenna signal port 140-5 of the antenna 310 to both the third column 120-3 and the seventh column 120-7. Similarly, the fourth coupler and/or splitter 360-4 connects a seventh antenna signal port 140-7 of the antenna 310 to both the fourth column 120-4 and the eighth column 120-8. The antenna signal ports 140-1, 140-3, 140-5, and 140-7 may be first polarization ports. For simplicity of illustration, second polarization ports 140-2, 140-4, 140-6, and 140-8 are omitted from view in FIG. 3B. An identical circuit including another four couplers and/or splitters 360 may connect the second polarization ports 140-2, 140-4, 140-6, and 140-8 to the eight columns 120 of antenna array 212.

In some embodiments, the orientation of the hook baluns on the dipole radiators 132, 134 of the radiating elements 130 included in columns 120-5 through 120-8 may be reversed as compared to the orientation of the hook baluns on the dipole radiators 132, 134 of the radiating elements 130 included in columns 120-1 through 120-4, thus offsetting the phases of the signals fed to the four left-side columns 120 as compared to the four right-side columns 120 by 180 degrees. Moreover, the columns 120 may be spaced apart from each other by at least 62 mm in some embodiments.

FIG. 3C is a table illustrating the relative amplitudes and phases applied to the signals fed to the four columns 120 of the antenna array 312 of FIG. 3A via the coupling circuit 350 of FIG. 3B in order generate eight antenna beams (four at each polarization). The table of FIG. 3C may be interpreted in the same manner as the table of FIG. 1B, which is described in detail above. It will be appreciated that the amplitudes and phases shown in the table of FIG. 3C may be adjusted in order to "tune" the shapes of the generated antenna beams in order to meet customer requirements. The amplitudes shown are merely examples.

FIG. 3D is a schematic diagram illustrating another coupling circuit 350' according to embodiments of the present invention that can be used to couple the 8T8R radio 290 of FIG. 3A to the eight-column antenna array 312 of FIG. 3A. The first coupler and/or splitter 360-1 connects the first antenna signal port 140-1 of the antenna 310 to both the third column 120-3 and the seventh column 120-7. The second coupler and/or splitter 360-2 connects the third antenna signal port 140-3 to both the fourth column 120-4 and the eighth column 120-8. The third coupler and/or splitter 360-3 connects the fifth antenna signal port 140-5 to both the first column 120-1 and the fifth column 120-5. Similarly, the fourth coupler and/or splitter 360-4 connects the seventh antenna signal port 140-7 to both the second column 120-2 and the sixth column 120-6. Accordingly, as shown in FIGS. 3B and 3D, the couplers and/or splitters 360 can feed various combinations of non-adjacent columns 120.

In some embodiments, the orientation of the hook baluns on the dipole radiators 132, 134 of the radiating elements 130 included in columns 120-1, 120-2, 120-7 and 120-8 may be reversed as compared to the orientation of the hook baluns on the dipole radiators 132, 134 of the radiating elements 130 included in columns 120-3 through 120-6 in order to implement the phase shifts between the signals fed to various of the columns 120. Moreover, the columns 120 may be spaced apart from each other by at least 62 mm.

FIG. 3E is a table illustrating the relative amplitudes and phases applied to the signals fed to the four columns 120 of the antenna array 312 of FIG. 3A via the coupling circuit 350' of FIG. 3D in order generate eight antenna beams (four at each polarization). The table of FIG. 3E may be interpreted in the same manner as the table of FIG. 1B, which is described in detail above. It will be appreciated that the amplitudes and phases shown in the table of FIG. 3E may be adjusted in order to "tune" the shapes of the generated antenna beams in order to meet customer requirements.

In the table of FIG. 3E, the amplitudes for the RF signals fed to some of the columns are shown being within various ranges. For example, the amplitude of the RF signal fed to column 120-2 is shown as being in the range of −10.4 dB to −4.76 dB, and the amplitude of the RF signal fed to column 120-3 is shown as being in the range of −0.4 dB to −1.76 dB. This illustrates how couplers and/or splitters having different power division ratios may be used in order to fine tune the shapes of the antenna beams in order to meet customer requirements.

Figure 4A:
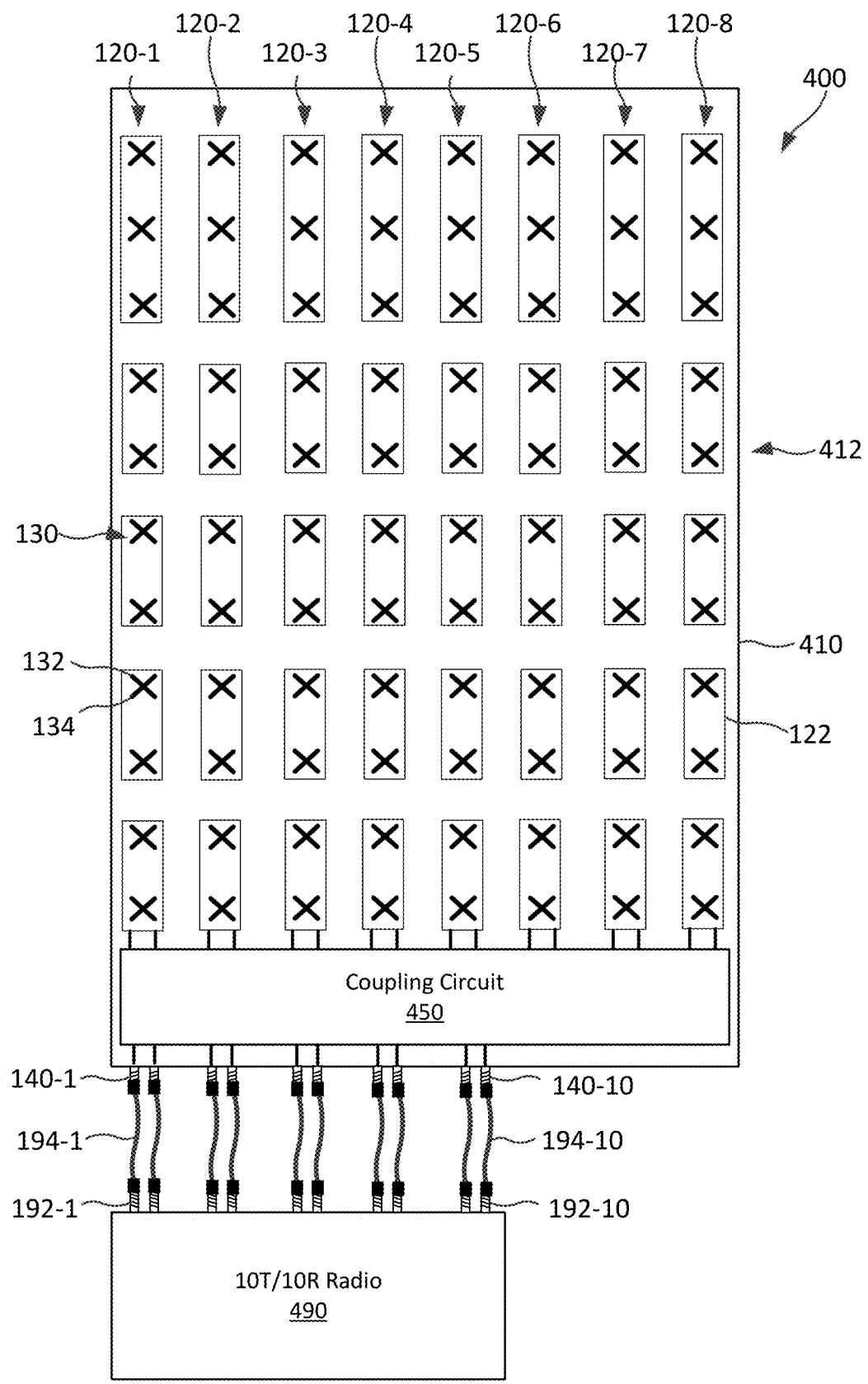
FIG. 4A is a schematic front view of an antenna system according to embodiments of the present invention that includes a 10T10R radio, a coupling circuit, and an antenna array that includes eight columns of dual-polarized radiating elements.

FIG. 4A is a schematic front view of an antenna system 400 according to further embodiments of the present invention that includes a 10T10R radio 490, a coupling circuit 450, and an antenna 410 having an antenna array 412 that includes eight columns 120 of dual-polarized radiating elements 130.

Figure 4B:
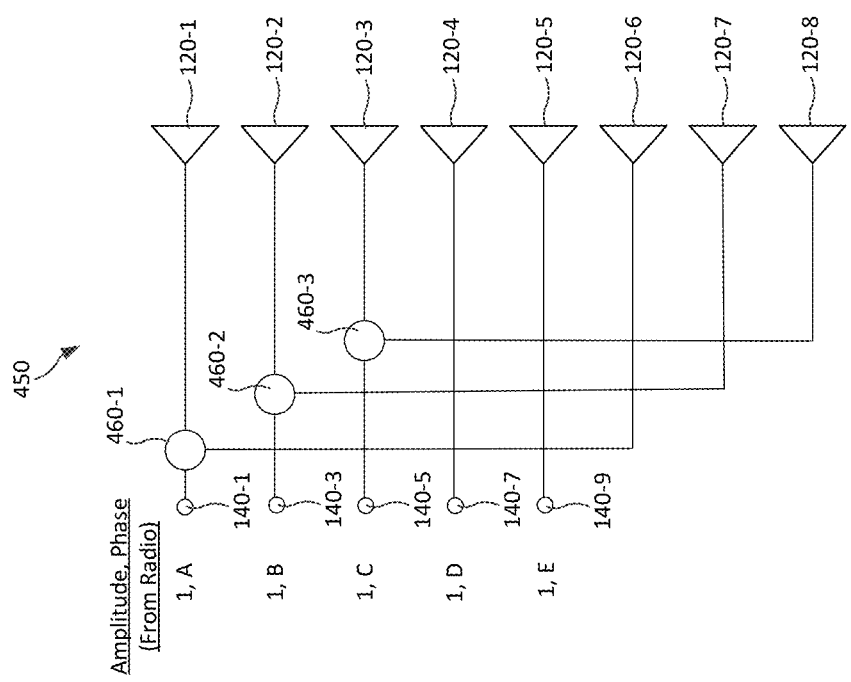
FIG. 4B is a schematic diagram illustrating a coupling circuit according to embodiments of the present invention that can be used to couple the 10T10R radio of FIG. 4A to the eight-column antenna array of FIG. 4A.

FIG. 4B is a schematic diagram illustrating an embodiment of the coupling circuit 450 that can be used to couple the 10T10R radio 490 of FIG. 4A to the eight-column antenna array of FIG. 4A. The coupling circuit 450 may include three couplers and/or splitters 460-1 through 460-3. Each of the couplers and/or splitters 460 may electrically connect a respective radio signal port 192 of the radio 490 (via a respective antenna signal port 140 of the antenna 410) to a pair of columns 120 of antenna array 412.

The first coupler and/or splitter 460-1 connects the first antenna signal port 140-1 to both the first column 120-1 and the sixth column 120-6. The second coupler and/or splitter 460-2 connects the third antenna signal port 140-3 to both the second column 120-2 and the seventh column 120-7. Likewise, the third coupler and/or splitter 460-4 connects the fifth antenna signal port 140-5 to both the third column 120-3 and the eighth column 120-8. Accordingly, each commonly-coupled pair of columns 120 may be a non-adjacent pair having four columns 120 therebetween.

Columns 120-4 and 120-5 may, in some embodiments, be individually (rather than commonly) coupled to respective antenna signal ports 140-7 and 140-9. Antenna signal ports 140-1 and 140-5, as well as antenna signal ports 140-3, 140-7, and 140-9, may be first polarization ports. For simplicity of illustration, second polarization antenna signal ports 140-2, 140-4, 140-6, 140-8, and 140-10 are omitted from view in FIG. 4B. An identical circuit including three additional couplers and/or splitters 460 may be used to couple the second polarization antenna signal ports 140-2, 140-4, 140-6, 140-4, and 140-10 to the second polarization radiators 134 of the radiating elements 130 in antenna array 412.

The coupling circuit 450 may be configured to provide a 180-degree phase offset between commonly-coupled columns 120. Moreover, the columns 120 may be spaced apart from each other by about 62 mm.

FIG. 4C is a table illustrating the relative amplitudes and phases applied to the signals fed to the eight columns of the antenna array of FIG. 4A via the coupling circuit of FIG. 4B in order generate the ten antenna beams (five at each polarization). As shown in FIG. 4C, in an example embodiment, columns 120-1 through 120-3 may be fed RF signals having the same amplitude and phase as the RF signals fed to columns 120-6 through 120-8, respectively. Columns 120-4 and 120-5, on the other hand, may be fed RF signals different amplitudes and phases.

FIG. 5A is a schematic front view of an antenna system 500 according to embodiments of the present invention that includes a 4T4R radio 590, a coupling circuit 550, and an antenna 510 having an antenna array 512 that includes four columns 120 of dual-polarized radiating elements 130.

FIG. 5B is a schematic diagram illustrating a coupling circuit 550 according to embodiments of the present invention that can be used to couple the 4T4R radio 590 of FIG. 5A to the four-column antenna array of FIG. 5A. The coupling circuit 550 may include two couplers 560-1 and 560-2. Each of the couplers and/or splitters 560 may electrically connect a respective radio signal port 192 of the radio 590 (via a respective antenna signal port 140 of the antenna 510) to a pair of columns 120.

The first coupler and/or splitter 560-1 connects the first antenna signal port 140-1 to both the first column 120-1 and the third column 120-3. Similarly, the second coupler and/or splitter 560-2 connects the third antenna signal port 140-3 both the second column 120-2 and the fourth column 120-4. Accordingly, each commonly-coupled pair of columns 120 may be a non-adjacent pair having one column 120 therebetween. The antenna signal ports 140-1 and 140-3 may be first polarization antenna signal ports. For simplicity of illustration, the second polarization antenna signal ports 140-2 and 140-4 are omitted from view in FIG. 5B. An identical circuit including two additional couplers and/or splitters 560 may be used to couple the second polarization antenna signal ports 140-2 and 140-4 to the second polarization radiators 134 of the radiating elements 130 in antenna array 512.

In some embodiments, the orientation of the hook baluns on the dipole radiators 132, 134 of the radiating elements 130 included in columns 120-1 and 120-4 may be reversed as compared to the orientation of the hook baluns on the dipole radiators 132, 134 of the radiating elements 130 included in columns 120-2 and 120-3 in order to implement the phase shifts between the signals fed to various of the columns 120. Moreover, the columns 120 may be spaced apart from each other by at least 58 mm.

FIG. 5C is a table illustrating the relative amplitudes and phases applied to the signals fed to the four columns of the antenna array of FIG. 5A via the coupling circuit that is shown in FIG. 5B in order generate four antenna beams (two at each polarization)

FIG. 6A is a schematic front view of an antenna system 600 according to embodiments of the present invention that includes a 8T8R radio 690, a coupling circuit 650, and an antenna 610 having an antenna array 612 that includes five columns 120 of dual-polarized radiating elements 130.

FIG. 6B is a schematic diagram illustrating a coupling circuit 650 according to embodiments of the present invention that can be used to couple the 8T8R radio 690 of FIG. 6A (with two radio signal ports 192 unused) to the five-column antenna array of FIG. 6A. The coupling circuit 650 may include two couplers and/or splitters 660-1 and 660-2. Each of the couplers and/or splitters 660 may electrically connect a respective radio signal port 192 (via a respective antenna signal port 140 of the antenna 610) to a pair of columns 120.

The first coupler and/or splitter 660-1 connects the first antenna signal port 140-1 to both the first column 120-1 and the fourth column 120-4. Similarly, the second coupler and/or splitter 660-2 connects the third antenna signal port 140-3 to both the second column 120-2 and the fifth column 120-5. Accordingly, each commonly-coupled pair of columns 120 may be a non-adjacent pair having two columns 120 therebetween.

Column 120-3 may, in some embodiments, be the only column 120 that is coupled to the fifth antenna signal port 140-5. Antenna signal ports 140-1, 140-3, and 140-5, may be first polarization antenna signal ports. For simplicity of illustration, second polarization antenna signal ports 140-2, 140-4, and 140-6 are omitted from view in FIG. 6B. An identical circuit including two additional couplers and/or splitters 660 may be used to couple the second polarization antenna signal ports 140-2, 140-4 and 140-6 to the second polarization radiators 134 of the radiating elements 130 in antenna array 612. As shown in FIG. 6A, the beamforming radio 690 includes seventh and eighth radio signal ports 192-7 and 192-8 that are not coupled to the antenna 610 and instead are unused.

FIG. 6C is a table illustrating the relative amplitudes and phases applied to the signals fed to the five columns of the antenna array of FIG. 6A via the coupling circuit that is shown in FIG. 6B in order generate the four antenna beams (two at each polarization).

Figure 7A:
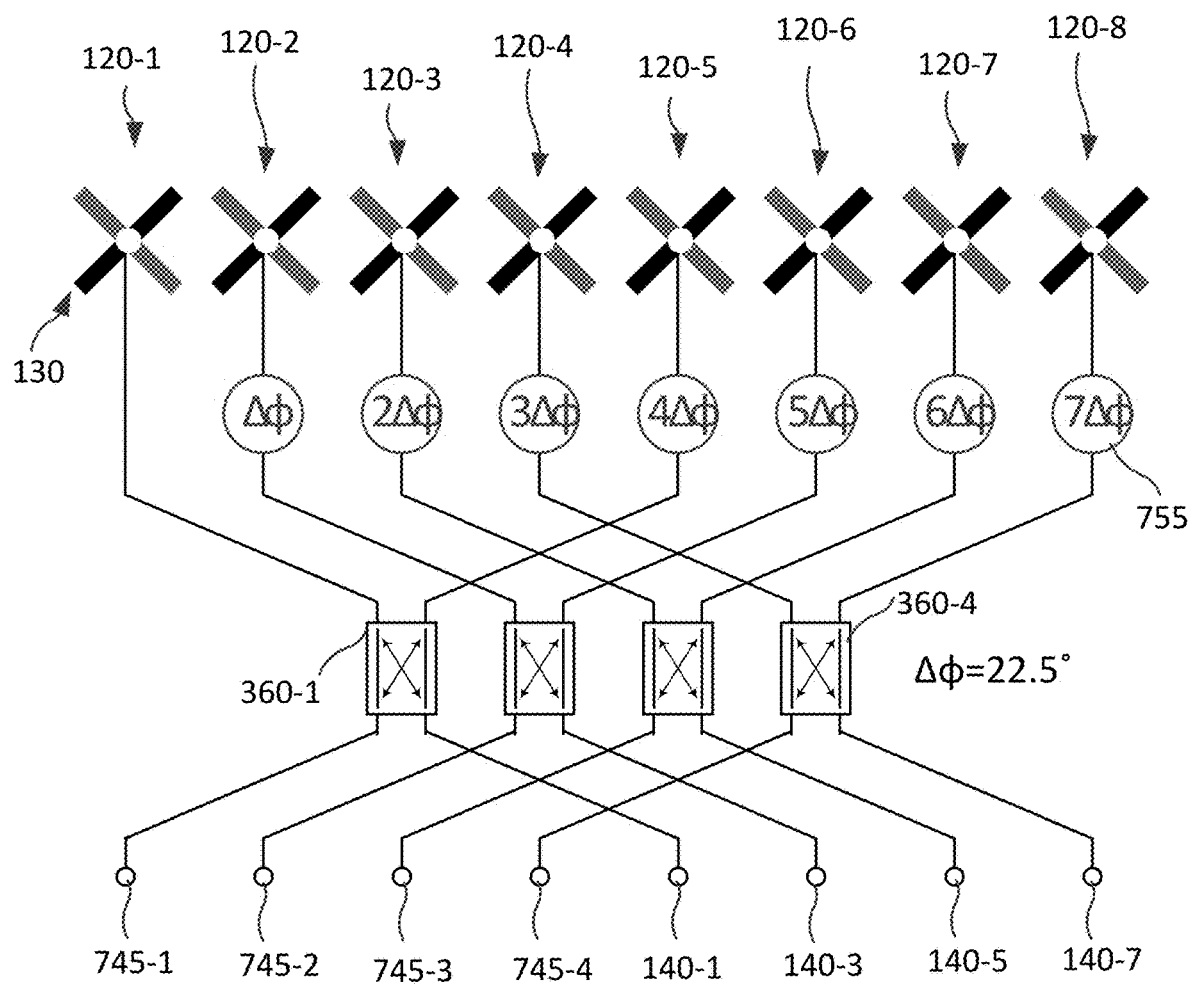
FIG. 7A is a schematic block diagram of an example implementation of the antenna array and coupling circuit of the antenna system of FIGS. 3A-3B (illustrating one polarization only).

FIG. 7A is a schematic block diagram of an example implementation of the antenna array 312 and coupling circuit 350 of the antenna system 300 of FIGS. 3A and 3B (illustrating one polarization only). In particular, FIG. 7A shows that each coupler and/or splitter 360 of the coupling circuit 350 may be a four-port hybrid coupler having (i) an RF input port that is coupled to a respective antenna signal port 140 (FIG. 3A) and thus to a respective radio signal port 192 (FIG. 3A), (ii) a first RF output port that is coupled to one of the columns 120, (iii) a second RF output port that is coupled to another of the columns 120, and (iv) an isolation port that is coupled to a resistive termination 745 (e.g., a 50-Ohm resistor). For simplicity of illustration, only one radiating element 130 is shown per column 120.

In some embodiments, analog RF circuitry may provide a phase adjustment to a signal that is output from a coupler and/or splitter 360 before it reaches a column 120. For example, respective phase-adjustment components 755 may be coupled to the columns 120. As an example, the phase-adjustment components 755 may be delay lines or other phase shifting elements.

Figure 7B:
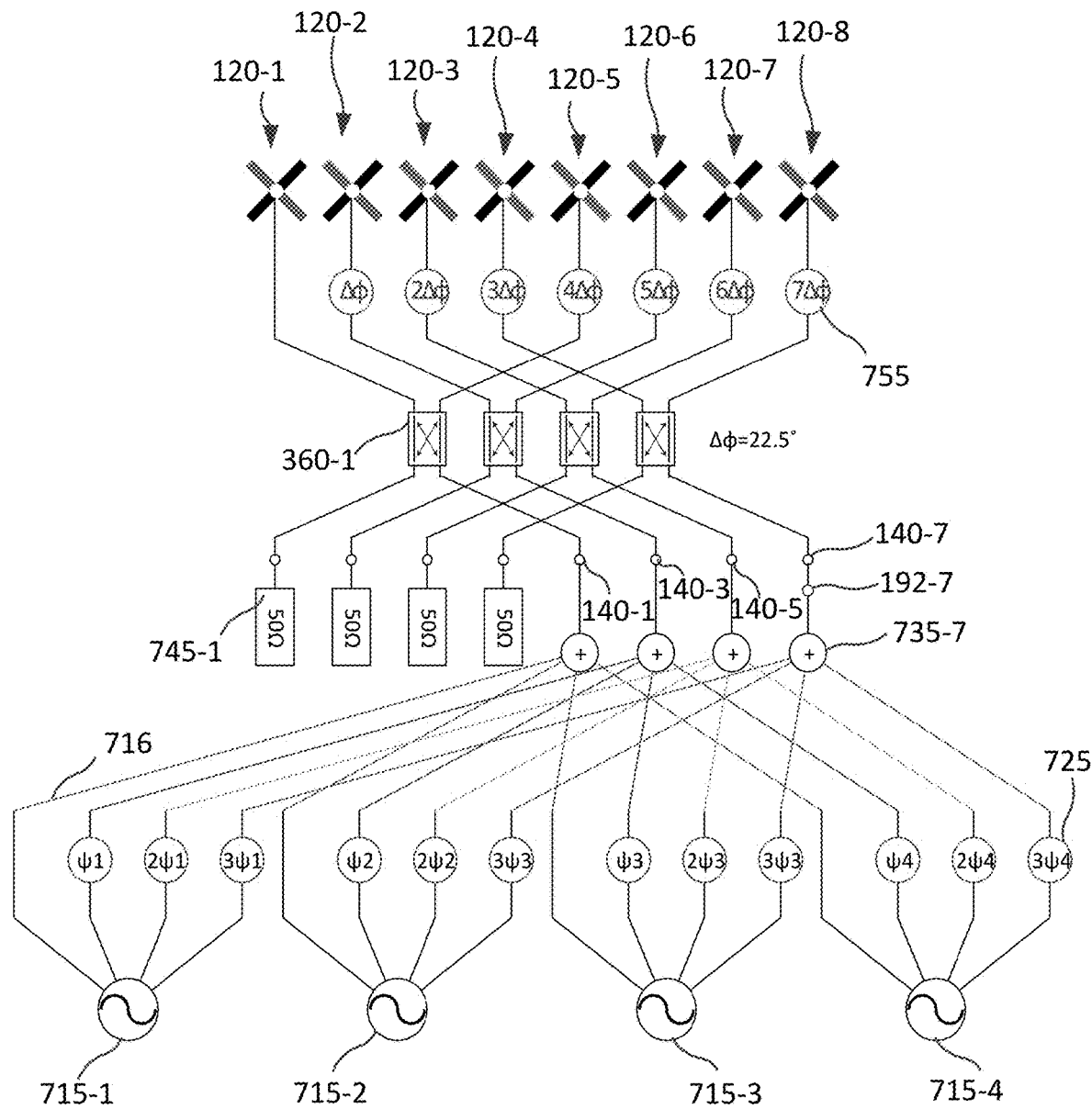
FIG. 7B is a schematic block diagram illustrating how the first polarization signal sources of an 8T8R radio may be coupled to the antenna array and coupling circuit of FIG. 7A.

FIG. 7B is a schematic block diagram illustrating how the signal sources of an 8T8R radio may be coupled to the antenna array and coupling circuit of FIG. 7A. For simplicity of illustration, the interface between the radio 290 and the antenna 310 (FIG. 3A) is represented in FIG. 7B by only the four first polarization antenna signal ports 140-1, 140-3, 140-5, and 140-7. As shown in more detail in FIG. 3A, the first polarization antenna signal ports 140-1, 140-3, 140-5, and 140-7 are coupled to respective first polarization radio signal ports 192-1, 192-3, 192-5, and 192-7 of the radio 290. Each radio signal port 192 may be coupled between a respective combiner 735 and a respective antenna signal port 140. For simplicity of illustration, however, only radio signal port 192-7 is shown in FIG. 7B. A circuit identical to the circuit shown in FIG. 7B also exists for the second polarization.

The radio 290 includes four first polarization RF signal sources 715. Each signal source 715 is configured to generate four different RF signal components 716 that the radio 290 provides to different respective ports 192. For example, the radio 290 may include RF combiners 735 that each combine four signal components 716 from respective signal sources 715 and output the resulting combined signal to a radio signal port 192. Accordingly, each first polarization signal source 715 may be coupled to all of the first polarization radio signal ports 192, and may simultaneously generate signal components 716 for four antenna beams.

Moreover, the radio 290 may be configured to individually adjust each signal component 716. As an example, the radio 290 may include phase-adjustment components 725 that are between the signal sources 715 and the combiners 735, or may otherwise generate RF components having different phases, as shown in FIG. 7B.

In some embodiments, functionality of the phase-adjustment components 725 and/or the combiners 735 may be provided by the radio 290 in the digital domain rather than using analog RF components. Moreover, the radio 290 can control each of the signal sources 715 to individually turn on or off an antenna beam. For example, the radio 290 can do so by controlling the signal sources 715 to individually turn on or off any of the signal components 716.

Figure 8:
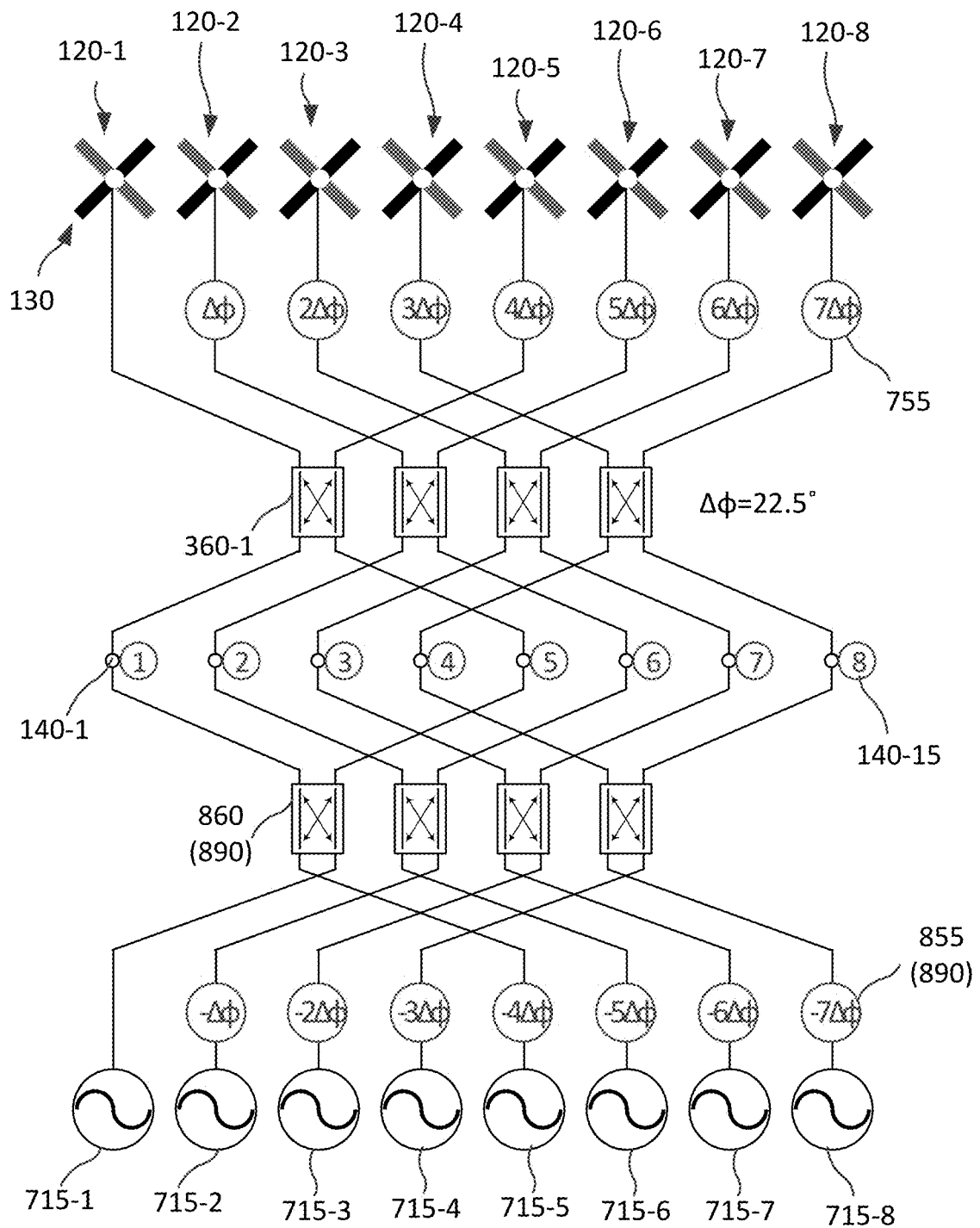
FIG. 8 is a schematic diagram of an antenna system according to embodiments of the present invention.

FIG. 8 is a schematic diagram of an antenna system according to embodiments of the present invention. The system may include a 16T16R radio 890. The radio 890 may include eight RF signal sources 715 per polarization. Moreover, the radio 890 may include phase-adjustment components 855 that mirror analog phase-adjustment components 755 that are between the columns 120 and the couplers and/or splitters 360. The radio 890 may also include couplers and/or splitters 860 that mirror the couplers and/or splitters 360. In some embodiments, the radio 890 may provide functionality of the couplers and/or splitters 860 and the phase-adjustment components 855 in the digital domain rather than using analog RF components. Accordingly, the radio 890 may compensate for analog RF circuitry, such as the couplers and/or splitters 360 and the phase-adjustment components 755, that feeds the columns 120 by digitally mirroring the analog RF circuitry. Such digital mirroring may be less expensive than analog mirroring (i.e., additional hardware) inside the radio 890.

Figure 9:
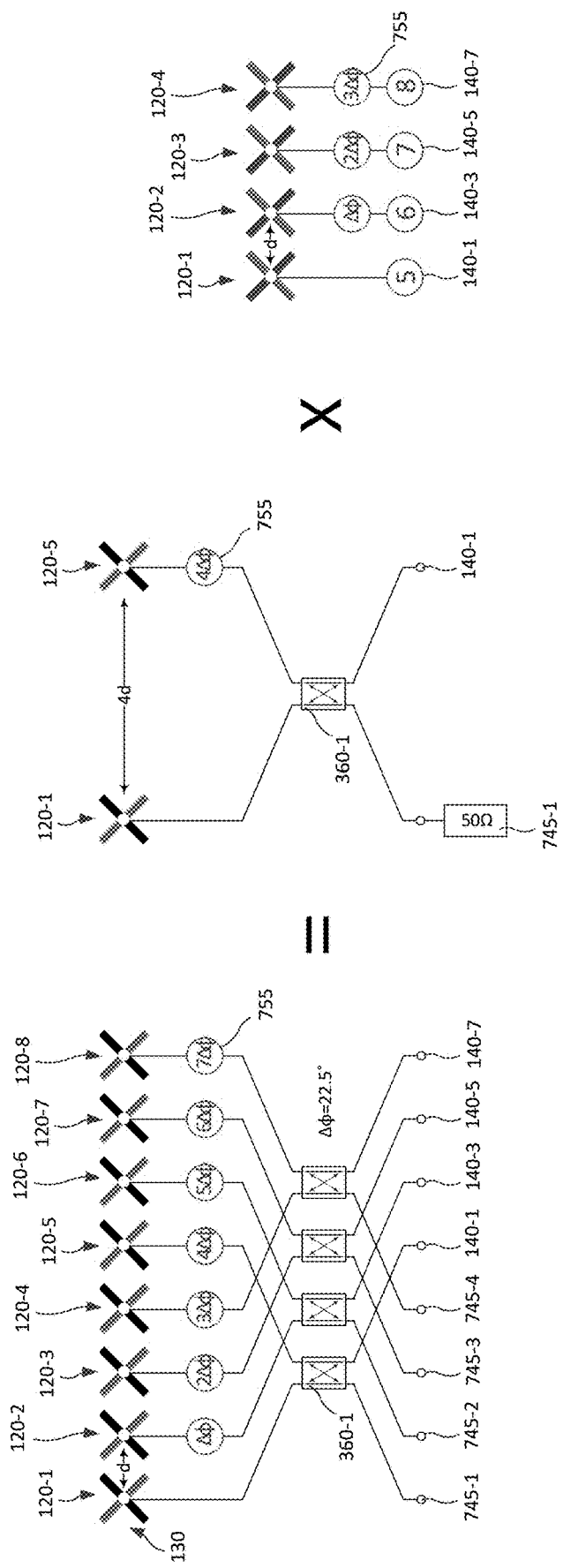
FIG. 9 is a schematic diagram illustrating how the antenna systems according to embodiments of the present invention may be viewed as including a plurality of multi-column sub-arrays.

FIG. 9 is a schematic diagram illustrating how the antenna systems according to embodiments of the present invention may be viewed as including a plurality of multi-column sub-arrays. As shown in FIG. 9, adjacent columns 120 may be spaced apart from each other (center-to-center) by a distance d. Accordingly, a pair of columns 120-1 and 120-5 that are commonly-fed by a coupler and/or splitter 360-1 and have three columns 120 therebetween may be spaced apart by a distance 4d. This commonly-fed pair may be considered a two-column 120 sub-array. In aggregate, the antenna system may thus have four two-column 120 sub-arrays.

Antenna systems according to embodiments of the present invention can generate any multiple antenna beams, which may be defined by the distance 4d. This example is 4 times a half wavelength, so it is for four antenna beams.

Figure 10:
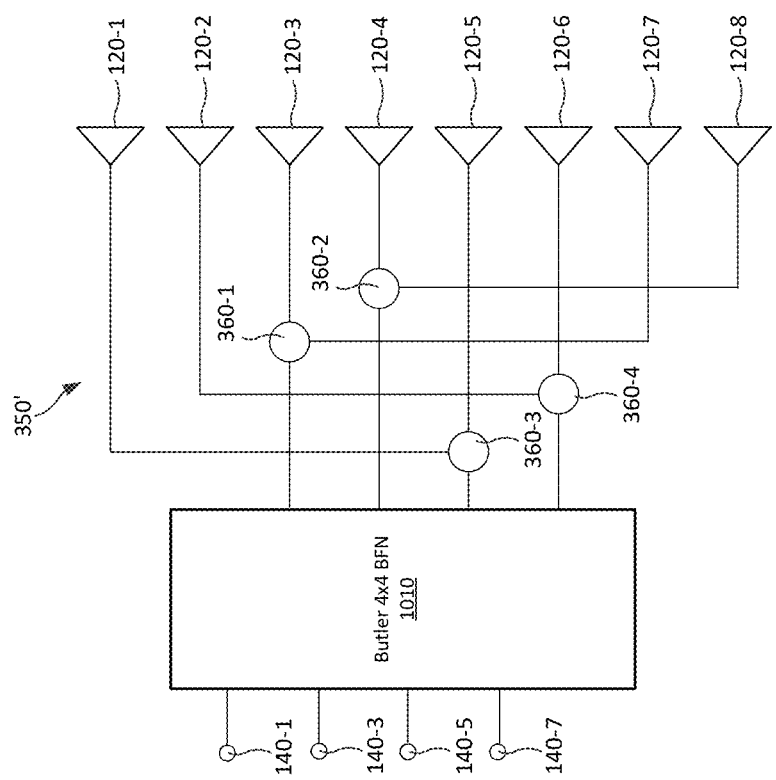
FIG. 10 is a schematic diagram illustrating a Butler Matrix beamforming network that is connected to the coupling circuit of FIG. 3D.

FIG. 10 is a schematic diagram illustrating a Butler Matrix beamforming network ("BFN") 1010 that is connected to the coupling circuit 350' of FIG. 3D. The BFN 1010 is configured to generate progressive phase (e.g., −157.5, +67.5, −67.5, and +157.5, for different columns 120) that creates antenna beams. Moreover, the coupling circuit 350' is provided merely as an example, and any coupling circuit herein may be connected to a Butler Matrix BFN. As shown in FIG. 10, the BFN 1010 is a 4×4 (four ports connected to four radios) BFN that is connected between the coupling circuit 350' and ports 140-1, 140-3, 140-5, and 140-7 of antenna 310 (FIG. 3A). Accordingly, the BFN 1010 may, in some embodiments, be an analog circuit that is inside the antenna 310. In other embodiments, matrix manipulation that the BFN 1010 is configured to perform may instead be performed digitally by the radio 290 (FIG. 3A).

As a result of using the BFN 1010 for beamforming, each of the 4 ports 140 of a given polarization may be connected to all (e.g., all 8) columns 120. For simplicity of illustration, only one polarization is shown in FIG. 10. The same BFN 1010, however, may be connected to couplers and/or splitters 360 of both polarizations.

Figure 11A:
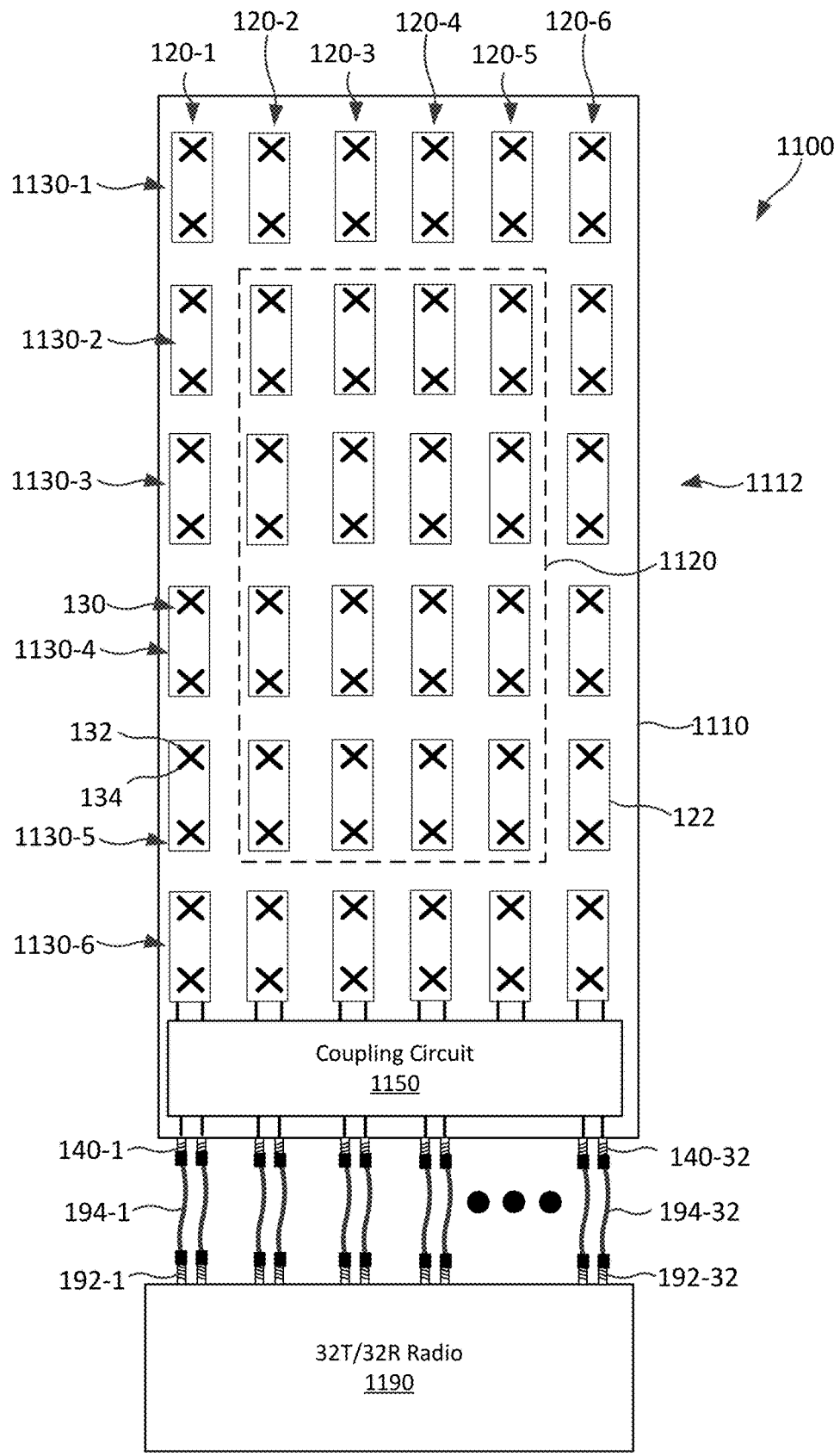
FIGS. 11A and 11B are schematic front views of massive MIMO antenna systems according to embodiments of the present invention.
Figure 11B:
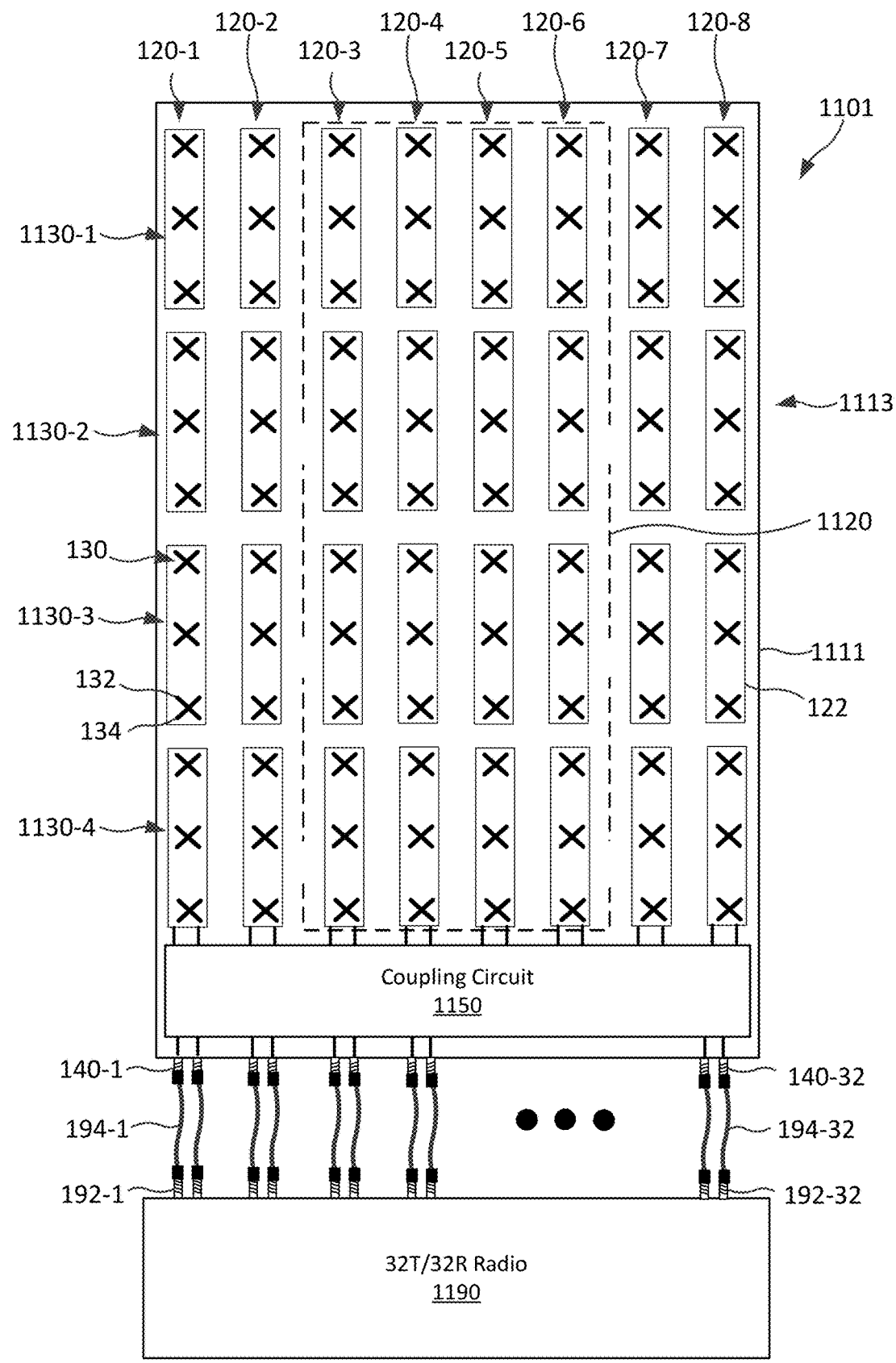

FIGS. 11A and 11B are schematic front views of massive MIMO antenna systems according to embodiments of the present invention. As shown in FIG. 11A, antenna system 1100 according to embodiments of the present invention includes a 32T32R beamforming radio 1190, a coupling circuit 1150, and an antenna 1110 having an antenna array 1112 that includes six columns 120-1 through 120-6 and six rows 1130-1 through 1130-6 of dual-polarized radiating elements 130. The radio 1190 includes thirty-two radio signal ports 192-1 through 192-32. In some embodiments, all thirty-two ports 192 (i.e., sixteen ports 192 per polarization) are coupled to the antenna array 1112 through the coupling circuit 1150.

As schematically illustrated in FIG. 11A, the coupling circuit 1150 may include a plurality of couplers and/or splitters (e.g., power dividers) 1160 (FIG. 12A) that are coupled to multiple rows 1130, thereby providing a significant cost saving by facilitating the use of the radio 1190 rather than a 64T64R radio, which would have sixty-four radio signal ports. Each radio signal port 192 of the radio 1190 may thus be shared by multiple rows 1130 instead of (or in addition to) being shared by multiple columns 120. Accordingly, while other examples herein discuss columns 120 that share an RF signal that is output by a single port 192, each port 192 in those examples that outputs an RF signal may additionally or alternatively be coupled to multiple rows 1130. To reduce the complexity of the feeding network (e.g., the coupling circuit 1150) for the antenna array 1112, only multiple rows 1130 or only multiple columns 120 (rather than both) may, in some embodiments, be coupled to each port 192.

As used herein, the term "row" refers to a row of groups 122 of radiating elements 130, where each group 122 may include at least two radiating elements 130. Moreover, some groups 122 may, in some embodiments, be in a sub-array 1120 of (e.g., a set of sixteen) groups 122 that share ports 192 of the radio 1190 with other groups 122 that are outside of the sub-array 1120. For example, (i) a group 122 that is outside of the sub-array 1120 in row 1130-1 and (ii) another group 122 that is inside the sub-array 1120 in row 1130-5 (and in. e.g., column 120-5) may be coupled to the radio 1190 by the same coupler and/or splitter 1160 of the coupling circuit 1150. Additional couplers and/or splitters 1160 of the coupling circuit 1150 may couple additional pairs of the groups 122 to the radio 1190.

In some embodiments, the antenna array 1112 may be expanded to include more rows 1130 and/or more columns 120 while still using the radio 1190. For example, adding two rows 1130 (for a total of eight) may increase the vertical gain of the antenna array 1112. As another example, adding two columns 120 (for a total of eight) may increase the azimuth gain of the antenna array 1112. On the other hand, using a total of six rows 1130 and six columns 120 can maintain a small size and low cost of the antenna array 1112 relative to expanded variants thereof. Accordingly, the antenna array 1112 may have at least six rows 1130 and at least six columns 120, with performance, size, and cost tradeoffs based on whether the number is six, seven, or eight.

Though the antenna array 1112 is shown as having seventy-two radiating elements 130, adding rows 1130 and/or columns 120 to the antenna array 1112 may increase the number of radiating elements 130 to, for example, ninety-six or one hundred twenty-eight. The antenna array 1112 may thus have at least seventy-two radiating elements 130 that are fed by ports 192 of the radio 1190.

Referring to FIG. 11B, antenna system 1101 according to embodiments of the present invention includes a 32T32R radio 1190, a coupling circuit 1150, and an antenna 1111 having an antenna array 1113 that includes eight columns 120-1 through 120-8 and four rows 1130-1 through 1130-4 of dual-polarized radiating elements 130. In particular, each group 122 in FIG. 11B includes exactly three radiating elements 130, whereas each group 122 in FIG. 11A includes exactly two radiating elements 130. Though the arrays 1112 (FIG. 11A) and 1113 may each have the same total number of radiating elements 130, the array 1112 may provide a better radiation pattern, due to its additional rows 1130.

Figure 12A:
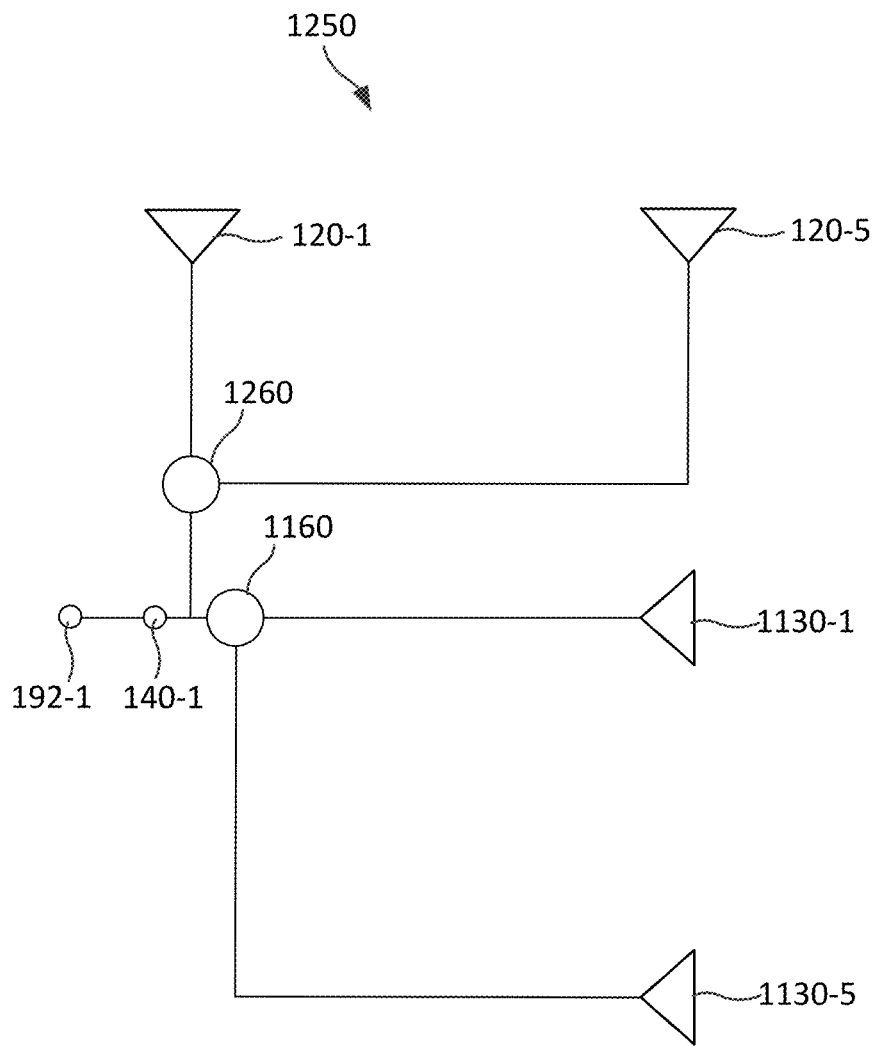
FIG. 12A is a schematic diagram illustrating a coupling circuit according to embodiments of the present invention that can be used to couple a port of the 32T32R radio of FIG. 11A to multiple rows and multiple columns of the antenna array of FIG. 11A.

FIG. 12A is a schematic diagram illustrating a coupling circuit 1250 according to embodiments of the present invention that can be used to couple a first polarization radio signal port 192-1 of the 32T32R radio 1190 of FIG. 11A to multiple rows 1130 and multiple columns 120 of the antenna array 1112 of FIG. 11A. In particular, FIG. 12A illustrates an example in which the port 192-1 is coupled to rows 1130-1 and 1130-5 by a coupler and/or splitter 1160, and is coupled to columns 120-1 and 120-5 by another coupler and/or splitter 1260. For simplicity of illustration, only one port 192-1 of one polarization of the 32T32R radio 1190 is shown in FIG. 12A. The coupling circuit 1250, however, may include additional couplers and/or splitters 1160 and 1260 that couple other first polarization radio signal ports 192 (e.g., ports 192-3, 192-5, etc.) to the array 1112. An identical coupling circuit 1250 may be used to couple the second polarization radio signal ports 192-2, 192-4, etc. to the columns 120 and rows 1130 of antenna array 1112. The coupling circuit 1250 may thus replace, or be a part of, another coupling circuit described herein, such as the coupling circuit 1150 of FIG. 11A.

Figure 12B:
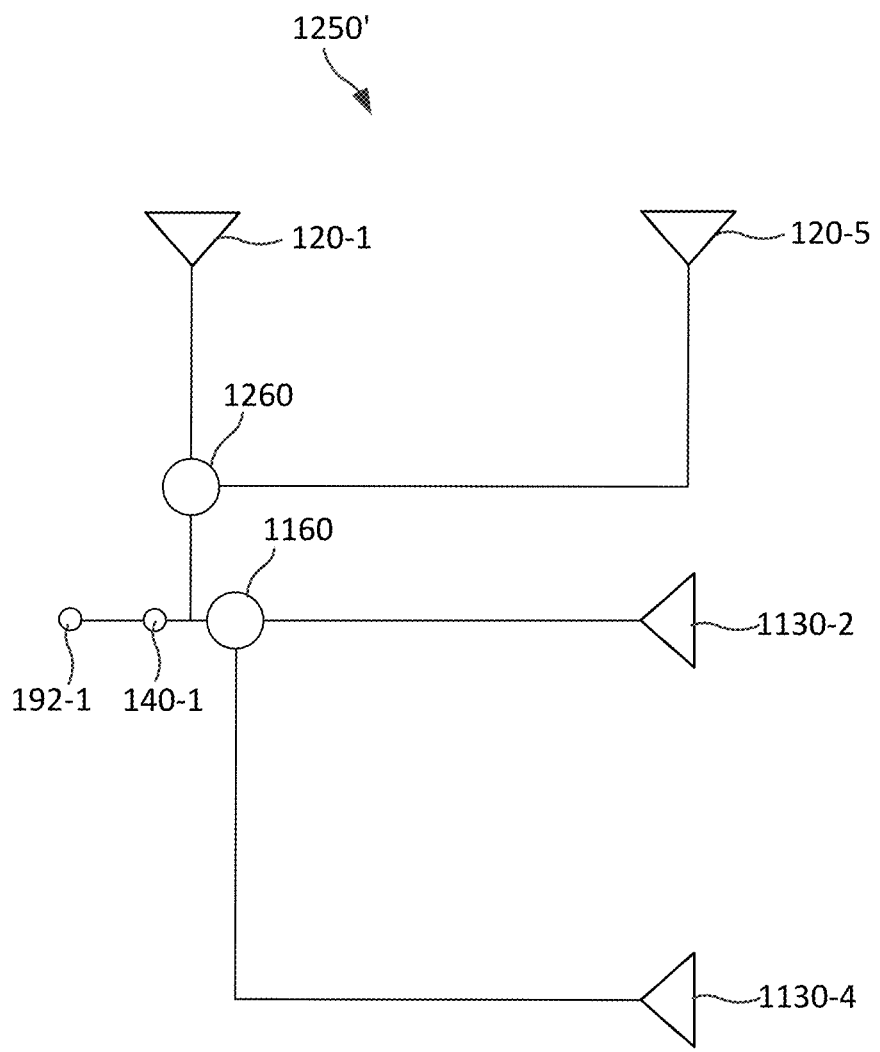
FIG. 12B is a schematic diagram illustrating a coupling circuit according to embodiments of the present invention that can be used to couple a port of the 32T32R radio of FIG. 11B to multiple rows and multiple columns of the antenna array of FIG. 11B.

FIG. 12B is a schematic diagram illustrating a coupling circuit 1250' according to embodiments of the present invention that can be used to couple a first polarization radio signal port 192-1 of the 32T32R 1190 radio of FIG. 11B to multiple rows 1130 and multiple columns 120 of the antenna array 1113 of FIG. 11B. In particular, FIG. 12B illustrates an example in which the port 192-1 is coupled to rows 1130-2 and 1130-4 by a coupler and/or splitter 1160, and is coupled to columns 120-1 and 120-5 by another coupler and/or splitter 1260. For simplicity of illustration, only one port 192-1 of one polarization of the 32T32R radio 1190 is shown in FIG. 12A. The coupling circuit 1250', however, may include additional couplers and/or splitters 1160 and 1260 that couple other first polarization radio signal ports 192 (e.g., ports 192-3, 192-5, etc.) to the array 1113. An identical coupling circuit 1250' may be used to couple the second polarization radio signal ports 192-2, 192-4, etc. to the columns 120 and rows 1130 of antenna array 1113. The coupling circuit 1250' may thus replace, or be a part of, another coupling circuit described herein, such as the coupling circuit 1150 of FIG. 11B.

The coupling circuits 1250, 1250' allow application of a flexible beam in both horizontal and vertical planes. Accordingly, performance of an antenna array that is coupled to a 32T32R radio (e.g., the radio 1190) by the coupling circuit 1250 (or the coupling circuit 1250') may be comparable to performance provided by an antenna array that is coupled to a 64T64R radio without the coupling circuit 1250 (or the coupling circuit 1250') therebetween.

Antenna systems according to embodiments of the present invention may provide a number of advantages. For example, referring to FIGS. 2A and 3A, analog RF circuitry, such as a coupling circuit 250 or 350, can allow multiple columns 120 to share an RF signal that is output by a single port 192 of an 8T8R radio 290. The analog RF circuitry may be inside an antenna 210 (FIG. 2A) or 310 (FIG. 3A) or may be in a standalone device that is coupled between the radio 290 and the antenna 210 or 310.

By contrast with a conventional antenna 110 (FIG. 1A) that has only four columns 120 (FIG. 1A) coupled to an 8T8R radio 190 (FIG. 1A), the antenna 210 or 310 may have at least six columns 120 that are fed by the 8T8R radio 290 via the analog RF circuitry. The antenna 210 or 310 can thus provide higher gain and higher capacity/throughput than the antenna 110. As an example, the antenna 210 or 310 can provide significantly better azimuth patterns/directivity than the antenna 110, and therefore can improve network capacity. An antenna system 200 or 300 having the radio 290 may also be significantly less expensive than a conventional antenna system having a 16T16R radio.

In some embodiments, beamforming radios are not limited to feeding at least six columns 120. Rather, as shown in the example of FIG. 6A, an 8T8R radio 690 uses no more than six ports 192 (three per polarization) to feed five columns 120. As another example, a beamforming radio may use no more than eight ports 192 (four per polarization) to feed five columns 120. Accordingly, beamforming radios of the present invention may be coupled to at least five columns 120, where the total number of columns 120 fed by a given beamforming radio may be larger than the radio's total number of ports 192 per polarization that are coupled the columns 120.

While embodiments of the present invention have been described above with reference to coupling circuits that split RF signals into first and second sub-components and feed these sub-components to first and second columns of radiating elements of an antenna array, it will be appreciated that embodiments of the present invention are not limited thereto. In particular, in other embodiments, 1-to-3, 1-to-4, 1-to-5 couplers and/or splitters and the like may be used to split an RF signal into more than two sub-components and to feed those sub-components to respective columns of an antenna array.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. An antenna system comprising:
  a beamforming radio having a plurality of first polarization signal sources and a plurality of first polarization radio signal ports, where each first polarization signal source is coupled to all of the first polarization radio signal ports;
  an antenna array having a plurality of columns of radiating elements; and
  a coupling circuit that includes a coupler and/or splitter that connects one of the first polarization radio signal ports to at least two of the columns of radiating elements,
  wherein the one of the first polarization radio signal ports is coupled to fewer than all of the columns of radiating elements.

2. The antenna system of claim 1, wherein a total number of the first polarization signal sources is equal to a total number of the first polarization radio signal ports.

3. The antenna system of claim 1, wherein the beamforming radio includes a total of X first polarization radio signal ports and the antenna array includes a total of Y columns of radiating elements, where X and Y are positive integers and Y is greater than X.

4. The antenna system of claim 3, wherein Y=2*X.

5. The antenna system of claim 3,
  wherein a total number of couplers and/or splitters included in the coupling circuit that couple the first polarization radio signal ports to the columns of radiating elements in the antenna array is equal to Y−X.

6. The antenna system of claim 1, wherein each first polarization signal source is coupled to all of the columns of radiating elements.

7. The antenna system of claim 1, wherein the coupling circuit includes a plurality of couplers and/or splitters that connect the first polarization radio signal ports to the columns of radiating elements in the antenna array, and wherein the antenna system further comprises a plurality of first polarization antenna signal ports and a Butler Matrix beamforming network that is connected between the first polarization antenna signal ports and the coupling circuit.

8. The antenna system of claim 7, wherein each coupler and/or splitter in the coupling circuit is only coupled to two of the columns of radiating elements, and wherein each coupler and/or splitter in the coupling circuit comprises a four-port coupler having an input port that is coupled to a respective one of the first polarization radio signal ports, first and second output ports that are coupled to respective ones of the columns of radiating elements, and an isolation port that is coupled to a resistive termination.

9. The antenna system of claim 1, wherein a hook balun of a radiating element in a first of the columns is flipped as compared to a hook balun of a radiating element in a second of the columns.

10. The antenna system of claim 1, wherein the splitter comprises a radio frequency (RF) power divider that connects the one of the first polarization radio signal ports to the at least two of the columns of radiating elements.

11. The antenna system of claim 1, wherein the coupling circuit further includes another coupler and/or splitter that connects the one of the first polarization radio signal ports to at least two rows of the radiating elements.

12. An antenna system comprising:
  a beamforming radio having W first polarization signal sources and X first polarization radio signal ports, where W and X are positive integers, where each first polarization signal source is coupled to all X of the first polarization radio signal ports;
  an antenna including:
    an antenna array having Y columns of radiating elements, where Y is a positive integer that is greater than X; and
    Z first polarization antenna signal ports that are coupled to the antenna array, where Z is a positive integer; and
  a coupling circuit that includes a plurality of couplers and/or splitters, the coupling circuit coupling the Z first polarization antenna signal ports to the Y columns of radiating elements.

13. The antenna system of claim 12, wherein a total number of couplers and/or splitters included in the coupling circuit that couple the Z first polarization antenna signal ports to the Y columns of radiating elements in the antenna array is equal to Y−Z.

14. The antenna system of claim 12, wherein each first polarization signal source is coupled to all Y columns of radiating elements.

15. The antenna system of claim 12, wherein each coupler and/or splitter in the coupling circuit is only coupled to two of the columns of radiating elements.

16. The antenna system of claim 12, wherein each coupler and/or splitter in the coupling circuit comprises a four-port coupler having an input port that is coupled to a respective one of the first polarization radio signal ports, first and second output ports that are coupled to respective ones of the columns of radiating elements, and an isolation port that is coupled to a resistive termination.

17. The antenna system of claim 12, wherein Z is less than Y.

18. The antenna system of claim 12, wherein the splitters comprise radio frequency (RF) power dividers that couple the Z first polarization antenna signal ports to the Y columns of radiating elements.

19. A base station antenna system comprising:
a beamforming array having a plurality of vertical columns of radiating elements that are each configured to transmit at least three antenna beams per polarization; and
a beamforming radio having a plurality of radio signal ports per polarization that are coupled to and fewer than the vertical columns.

20. The base station antenna system of claim 19,
wherein the vertical columns comprise at least five vertical columns of dual-polarized radiating elements, and
wherein the radio signal ports comprise no more than six radio signal ports that are coupled to the at least five vertical columns of dual-polarized radiating elements.

* * * * *